(12) United States Patent
Diepstraten et al.

(10) Patent No.: US 10,473,873 B2
(45) Date of Patent: Nov. 12, 2019

(54) FIBER OPTIC ENCLOSURE WITH CABLE MANAGEMENT DRAWER

(71) Applicant: TYCO ELECTRONICS RAYCHEM BVBA, Kessel-Lo (BE)

(72) Inventors: Patrick Jacques Ann Diepstraten, Heusden-Zolder (BE); Paul Joseph Claes, Tremelo (BE); Eddy Luc Cams, Bilzen (BE); Geert Van Genechten, Vorselaar (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 15/304,235

(22) PCT Filed: Apr. 14, 2015

(86) PCT No.: PCT/EP2015/058024
§ 371 (c)(1),
(2) Date: Oct. 14, 2016

(87) PCT Pub. No.: WO2015/158687
PCT Pub. Date: Oct. 22, 2015

(65) Prior Publication Data
US 2017/0045701 A1 Feb. 16, 2017

Related U.S. Application Data

(60) Provisional application No. 61/979,392, filed on Apr. 14, 2014.

(51) Int. Cl.
*G02B 6/44* (2006.01)
*G02B 6/38* (2006.01)

(52) U.S. Cl.
CPC ......... *G02B 6/4446* (2013.01); *G02B 6/3897* (2013.01); *G02B 6/445* (2013.01);
(Continued)

(58) Field of Classification Search
CPC .............. G02B 6/00; G02B 6/44; G02B 6/38
(Continued)

(56) References Cited

U.S. PATENT DOCUMENTS 5,402,515 A * 3/1995 Vidacovich .......... G02B 6/4452
385/135
5,708,751 A * 1/1998 Mattei .................. G02B 6/4452
385/134
(Continued)

FOREIGN PATENT DOCUMENTS

EP 0 797 114 A2 9/1997
ES 1 134 583 U 12/2014
(Continued)

OTHER PUBLICATIONS

International Search Report and Written Opinion of the International Searching Authority for corresponding International Patent Application No. PCT/EP2015/058024 dated Aug. 27, 2015, 16 pages.
(Continued)

*Primary Examiner* — Kaveh C Kianni
(74) *Attorney, Agent, or Firm* — Merchant & Gould P.C.

(57) ABSTRACT

A fiber optic enclosure system (100) includes an enclosure (102), a plurality of fiber optic adaptors (132), and a drawer (130). The enclosure (102) defines an enclosure chamber (108). The plurality of fiber optic adaptors (132) is arranged on the enclosure (102). The drawer (130) is used to route an optical fiber main cable (90) within the drawer (130). The drawer (130) is removably inserted into the enclosure chamber (108).

23 Claims, 20 Drawing Sheets

(52) U.S. Cl.
CPC ......... *G02B 6/4455* (2013.01); *G02B 6/4471* (2013.01); *G02B 6/4478* (2013.01)

(58) Field of Classification Search
USPC ........................................................ 385/135
See application file for complete search history.

(56) References Cited

U.S. PATENT DOCUMENTS

| | | | |
|---|---|---|---|
| 6,178,282 B1 | 2/2001 | Moribe et al. | |
| 6,899,467 B2 | 5/2005 | McDonald et al. | |
| 7,013,074 B2 | 3/2006 | Battey et al. | |
| 7,264,402 B2 | 9/2007 | Theuerkorn et al. | |
| 7,744,288 B2 | 6/2010 | Lu et al. | |
| 7,785,015 B2 | 8/2010 | Melton et al. | |
| 8,213,761 B2* | 7/2012 | Gronvall | G02B 6/4471 385/135 |
| 8,270,796 B2* | 9/2012 | Nhep | G02B 6/3825 385/135 |
| 8,363,997 B2* | 1/2013 | Hou | H04Q 1/08 385/135 |
| 8,556,520 B2 | 10/2013 | Elenbaas et al. | |
| 8,591,124 B2* | 11/2013 | Griffiths | G02B 6/4471 385/76 |
| 8,718,434 B2 | 5/2014 | Gronvall et al. | |
| 9,291,790 B2* | 3/2016 | Kimbrell | G02B 6/4471 |
| 9,513,451 B2* | 12/2016 | Corbille | G02B 6/4454 |
| 9,715,075 B2* | 7/2017 | Solheid | G02B 6/4455 |
| 2005/0271344 A1* | 12/2005 | Grubish | G02B 6/445 385/135 |
| 2006/0032659 A1* | 2/2006 | Allen | G02B 6/445 174/92 |
| 2006/0034578 A1* | 2/2006 | Allen | G02B 6/445 385/135 |
| 2009/0046985 A1* | 2/2009 | Gronvall | G02B 6/4442 385/135 |
| 2009/0097813 A1* | 4/2009 | Hill | G02B 6/4454 385/135 |
| 2009/0297112 A1* | 12/2009 | Mertesdorf | G02B 6/3897 385/135 |
| 2010/0183274 A1* | 7/2010 | Brunet | G02B 6/4452 385/135 |
| 2012/0057838 A1* | 3/2012 | Hill | G02B 6/4454 385/135 |
| 2012/0230646 A1 | 9/2012 | Thompson et al. | |
| 2013/0101262 A1* | 4/2013 | Wei | G02B 6/4442 385/135 |
| 2013/0209049 A1* | 8/2013 | Kowalczyk | G02B 6/4457 385/135 |
| 2014/0079365 A1* | 3/2014 | Hill | G02B 6/4455 385/135 |

FOREIGN PATENT DOCUMENTS

| | | |
|---|---|---|
| WO | 2009/076536 A1 | 6/2009 |
| WO | 2009/089327 A2 | 7/2009 |
| WO | 2010/088202 A1 | 8/2010 |
| WO | 2012/074688 A2 | 6/2012 |
| WO | 2014/005916 A2 | 1/2014 |
| WO | 2015/028428 A1 | 3/2015 |

OTHER PUBLICATIONS

"Huawei Enterprise ICT Solutions a Better Way: ODN Solution Introduction", Huawei Technologies Co., Ltd., 2012, 28 pages.

* cited by examiner

FIBER OPTIC ENCLOSURE WITH CABLE MANAGEMENT DRAWER

CROSS-REFERENCE TO RELATED APPLICATION

This application is a National Stage Application of PCT/EP2015/058024, filed Apr. 14, 2015, which claims the benefit of U.S. Provisional Patent Application Ser. No. 61/979,392, filed Apr. 14, 2014, and which applications are incorporated herein by reference. To the extent appropriate, a claim of priority is made to each of the above disclosed applications.

BACKGROUND

Fiber optic cables are widely used for telecommunications applications where high information capacity may be exploited. Fiber cable architectures are emerging for connecting homes and/or business establishments, via optical fibers, to a central location, for example. A trunk or main cable may be routed, for example, through a housing subdivision and small fiber count branch or drop cables may be spliced to the main cable at predetermined spaced apart locations.

A main cable may be installed underground or aerially and have multiple drop cables connected thereto. Each of the drop cables, in turn, may be routed to an optical network unit serving several homes. Information may then be transmitted optically to the optical network unit, and into the home, via conventional copper cable technology or optically via optical fiber extending all the way to the home. Alternatively, the drop cables may be routed directly to the house. Thus, the drop cables may serve groups of users, although other architectures may also employ a main cable and one or more drop cables connected thereto.

SUMMARY

In general terms, this disclosure is directed to a fiber optic enclosure system with a drawer. In one possible configuration and by non-limiting example, the drawer is removable to route an optical fiber pass-through cable therewithin. Various aspects are described in this disclosure, which include, but are not limited to, the following aspects.

In one aspect, a fiber optic enclosure system includes an enclosure, a plurality of fiber optic adaptors, and a drawer. The enclosure defines an enclosure chamber. The plurality of fiber optic adaptors is arranged on the enclosure. Each fiber optic adaptor includes first and second ports configured to receive fiber optic connectors. The first port is accessible from an outer side of the enclosure and the second port is accessible from an inner side of the enclosure. The drawer is configured to anchor and manage a pass-through cable configured to pass through the enclosure. The drawer includes an anchoring device for anchoring jacketed portions of the pass-through cable, and a fiber loop guide defining a fiber management loop at which an unjacketed portion of the pass-through cable is stored in a looped configuration. The drawer is configured to be removably inserted into the enclosure chamber, whereby the pass-through cable can be anchored to the drawer and the unjacketed portion of the pass-through cable can be stored in the looped configuration at the fiber management loop before the drawer is inserted into the enclosure chamber.

In some examples, the enclosure includes an insert hole configured to receive the drawer therethrough. The drawer may include a base plate and a face plate. The base plate may have a loop guide and a guide tab. The loop guide is configured to route the pass-through cable therealong. The guide tab is configured to contain the pass-through cable therebehind. The face plate is configured to engage the insert hole of the enclosure and includes a plurality of pass-through cable ports through which the pass-through cable is received onto the base plate.

In some examples, the drawer includes a drawer latch assembly configured to secure the drawer to the enclosure when the drawer is inserted into the enclosure.

In some examples, the enclosure has a cover and a base. The cover is movable relative to the base between an open position and a closed position. The base may include an endplate. The enclosure defines an enclosure chamber when the cover is in the closed position. The plurality of fiber optic adaptors is arranged on the endplate of the base.

In some examples, the insert hole is arranged on the endplate of the base.

In some examples, the enclosure includes a latch assembly and a latch tab. The latch tab may be arranged on lateral sides of the body. The latch assembly may be arranged on lateral sides of the cover and configured to engage the latch tab to secure the cover to the body in the closed position.

In some examples, the enclosure includes a sliding lock configured to secure the cover to the base.

In some examples, the sliding lock includes a sliding bar slideably arranged on the cover and a locking tab formed on the base. The sliding bar is configured to engage the locking tab when the cover and the base are in the closed position relative to each other.

In some examples, the enclosure includes a labyrinth seal formed by a first peripheral edge of the cover and a second peripheral edge of the base. The first peripheral edge of the cover is configured to engage the second peripheral edge of the base.

In some examples, the enclosure includes a gasket seal engaged between the first and second peripheral edges.

In some examples, the system further includes one or more splice trays on which optical fibers are spliced; and a splice tray tower configured to receive a portion of the drawer and pivotally mount the splice trays in a raised position.

In some examples, the system further includes a splitter module including a splitter input fiber and a plurality of splitter output pigtails. At least part of the splice trays may include a splitter module engaging area configured to engage the splitter module.

In some examples, the system further includes a cable stop configured to limit an extension of a strength member out of a cable.

In some examples, the drawer includes an anchoring device. The anchoring device may include a fixing base formed on the drawer; a fixing cap configured to be fastened to the fixing base to define a cable hole through which the pass-through cable passes; and an elongate plate extending outside the cable hole and configured to support the pass-through cable to prevent torsion of the pass-through cable.

In another aspect, a fiber optic enclosure system includes an enclosure having a cover and a base. The cover is movable relative to the base between an open position and a closed position. The base may include an endplate. The enclosure defines an enclosure chamber when the cover is in the closed position. The enclosure system further includes a plurality of fiber optic adaptors arranged on the enclosure. Each fiber optic adaptor may include first and second ports configured to receive fiber optic connectors. The first port is accessible from an outer side of the enclosure and the second port is accessible from an inner side of the enclosure. The enclosure system further includes a tool-less sliding lock configured to secure the cover to the base.

In yet another aspect, a fiber optic enclosure system includes an enclosure, a plurality of fiber optic adaptors, a latch tab, and a latch assembly. The enclosure has a cover and a base. The cover is movable relative to the base between an open position and a closed position. The base includes an endplate. The enclosure defines an enclosure chamber when the cover is in the closed position. The plurality of fiber optic adaptors is arranged on the endplate but not on the cover. Each fiber optic adaptor includes first and second ports configured to receive fiber optic connectors. The first port is accessible from an outer side of the enclosure and the second port is accessible from an inner side of the enclosure. The latch tab is arranged on lateral sides of the body. The latch assembly is arranged on lateral sides of the cover and configured to engage the latch tab to secure the cover to the body in the closed position.

In yet another aspect, a fiber optic enclosure system includes an enclosure, a plurality of fiber optic adaptors, and a labyrinth seal. The enclosure has a cover and a base. The cover is movable relative to the base between an open position and a closed position. The base includes an endplate. The enclosure defines an enclosure chamber when the cover is in the closed position. The plurality of fiber optic adaptors is arranged on the enclosure. Each fiber optic adaptor includes first and second ports configured to receive fiber optic connectors. The first port is accessible from an outer side of the enclosure and the second port is accessible from an inner side of the enclosure. The labyrinth seal is formed by a first peripheral edge of the cover and a second peripheral edge of the base. The first peripheral edge of the cover is configured to engage the second peripheral edge of the base. The enclosure system may further include a gasket seal engaged between the first and second peripheral edges.

In yet another aspect, a fiber optic enclosure system includes an enclosure, a plurality of fiber optic adaptors, a drawer, one or more splice trays, and a splice tray tower. The enclosure defines an enclosure chamber. The plurality of fiber optic adaptors is arranged on the enclosure. Each fiber optic adaptor includes first and second ports configured to receive fiber optic connectors. The first port is accessible from an outer side of the enclosure and the second port is accessible from an inner side of the enclosure. The drawer is configured to anchor and manage a pass-through cable configured to pass through the enclosure. The drawer is configured to be removably inserted into the enclosure chamber. The one or more splice trays provide space on which optical fibers are spliced. The splice tray tower is configured to receive a portion of the drawer and pivotally mount the splice trays in a raised position. The splice tray tower may further include a routing guide having a curved surface configured to route cables therealong at a radius not less than a minimum bend radius of the cables.

In yet another aspect, a fiber optic enclosure system includes an enclosure, a plurality of fiber optic adaptors, a drawer, and an anchoring device. The enclosure defines an enclosure chamber. The plurality of fiber optic adaptors is arranged on the enclosure. Each fiber optic adaptor includes first and second ports configured to receive fiber optic connectors. The first port is accessible from an outer side of the enclosure and the second port is accessible from an inner side of the enclosure. The drawer is configured to anchor and manage a pass-through cable configured to pass through the enclosure. The drawer is configured to be removably inserted into the enclosure chamber. The anchoring device includes a fixing base formed on the drawer; a fixing cap configured to be fastened to the fixing base to define a cable hole through which the pass-through cable passes; and an elongate plate extending outside the cable hole and configured to support the pass-through cable to prevent torsion of the pass-through cable. The elongate plate may include a turn-down flange at a forward end thereof. The turn-down flange is curved down toward a bottom surface of the drawer. The turn-down flange may be inserted into a slot formed on the bottom surface of the drawer. In some examples, the anchoring device may further include spikes configured to be partially embedded in a jacket of the cable.

In yet another aspect, a fiber optic enclosure system includes an enclosure, a plurality of fiber optic adaptors, and a sealing unit. The enclosure defines an enclosure chamber. The plurality of fiber optic adaptors is arranged on the enclosure. Each fiber optic adaptor includes first and second ports configured to receive fiber optic connectors. The first port is accessible from an outer side of the enclosure and the second port is accessible from an inner side of the enclosure. The sealing unit is configured in a wrap-around configuration, defining cable ports for a cable. The sealing unit may include a sealant ring having a plurality of sealing blocks, the sealing blocks defining the cable ports when coupled; and an actuation arrangement configured to pressurize the sealant ring to cause the sealant ring to form seals around the pass-through cable routed through the cable ports and seals around the sealing unit relative to the enclosure. The actuation arrangement may include first and second pressurization structures between which the sealant ring is positioned; and an actuator configured to force the first and second pressurization structures together to pressurize the sealant ring.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
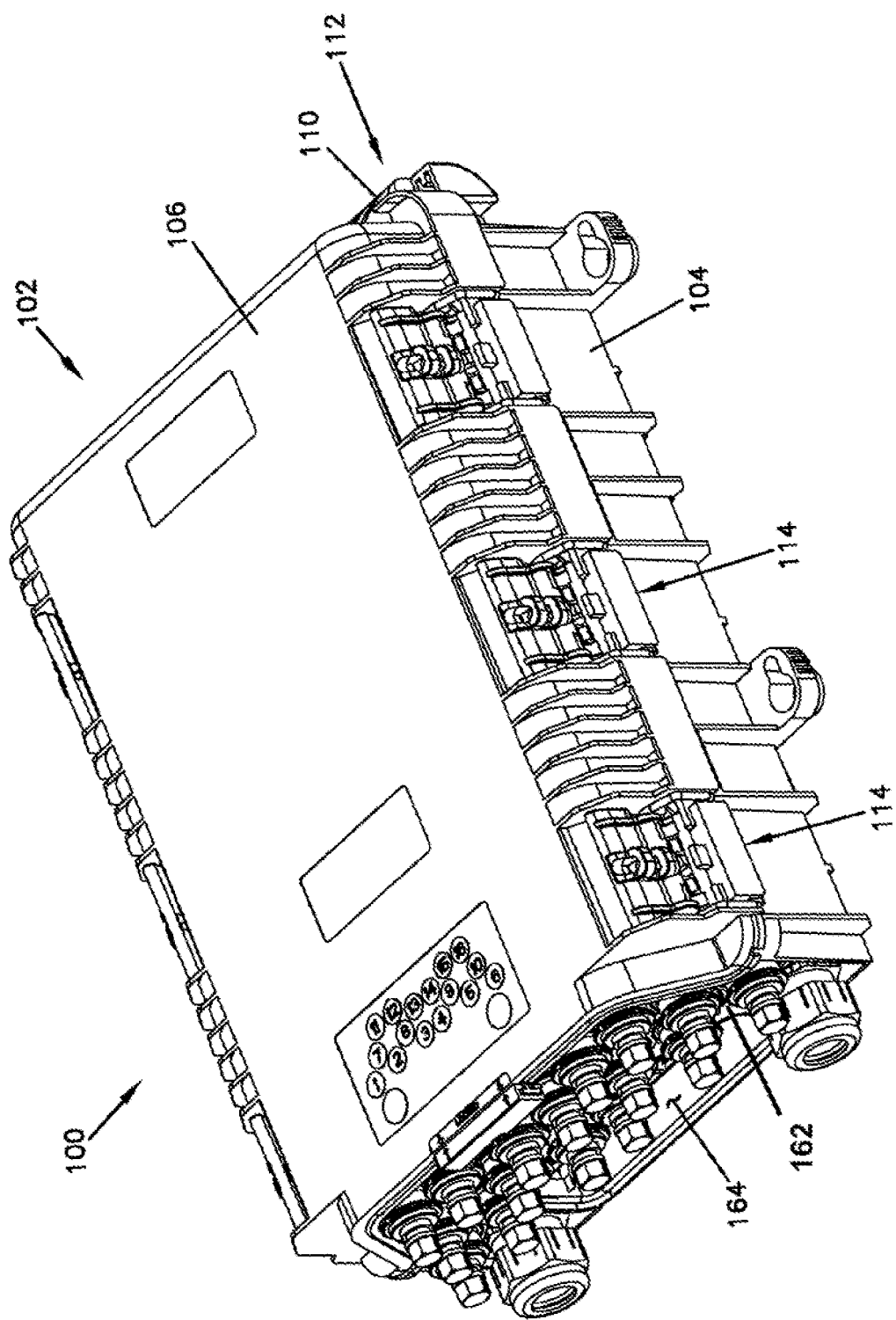
FIG. 1 is a perspective view of an optical fiber splicing enclosure system according to one example of the present disclosure.

FIG. 1 is a perspective view of an optical fiber splicing enclosure system 100 according to one example of the present disclosure. The system 100 operates to couple an optical fiber branch cable and/or optical fiber drop cables 92 (FIG. 2) to an optical fiber main cable 90 (FIG. 2) at a termination portion. The optical fiber main cable 90 is also referred to herein as a feeder cable or a pass-through cable. In some examples, the optical fiber main cable 90 is a feed from a service provider central office intended to provide service to individual subscriber locations in various locations in the field. The termination point may be positioned close to a neighborhood or the like and the branch cable and the drop cables may deliver an optical fiber connection to the subscriber location and/or to a junction box or the like where, for example, a copper connection may be routed for the last leg to the subscribe location. Alternatively, drop cables may be routed directly from the enclosure system 100 to the subscriber location, such as the subscriber's house.

The optical fiber main cable 90 includes a cable jacket surrounding a plurality of buffer tubes and one or more optical fibers extending through each buffer tube. The main cable 90 may also include other components such as a tubular metal grounding shield, or one or more strength members. Similarly, the branch cable may include an outer jacket, one or more buffer tubes extending longitudinally through the outer jacket, and one or more optical fibers extending through the buffer tube(s). Each drop cable may likewise include an outer jacket, a buffer tube extending longitudinally through the outer jacket, and one or more optical fibers extending through the buffer tube.

Figure 2:
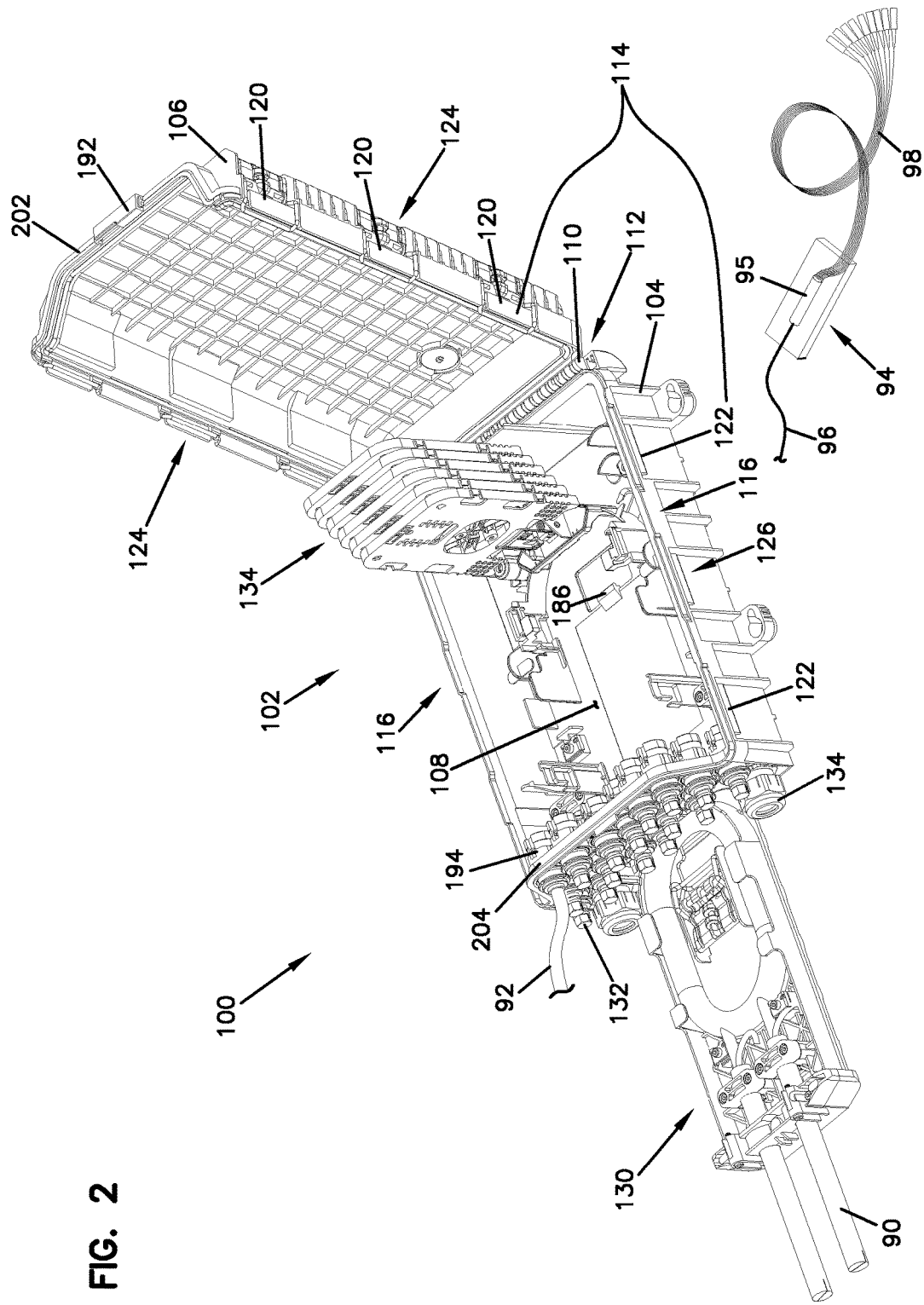
FIG. 2 is a perspective view of the enclosure system of FIG. 1 arranged in an open position.

As shown in FIG. 1, the enclosure system 100 includes an enclosure 102. In some examples, the enclosure 102 includes a base 104 and a lid or cover 106. The base 104 and the cover 106 collectively define an enclosure chamber 108 (FIG. 2). The enclosure 102 is described in further detail with reference to FIG. 2.

Figure 3:
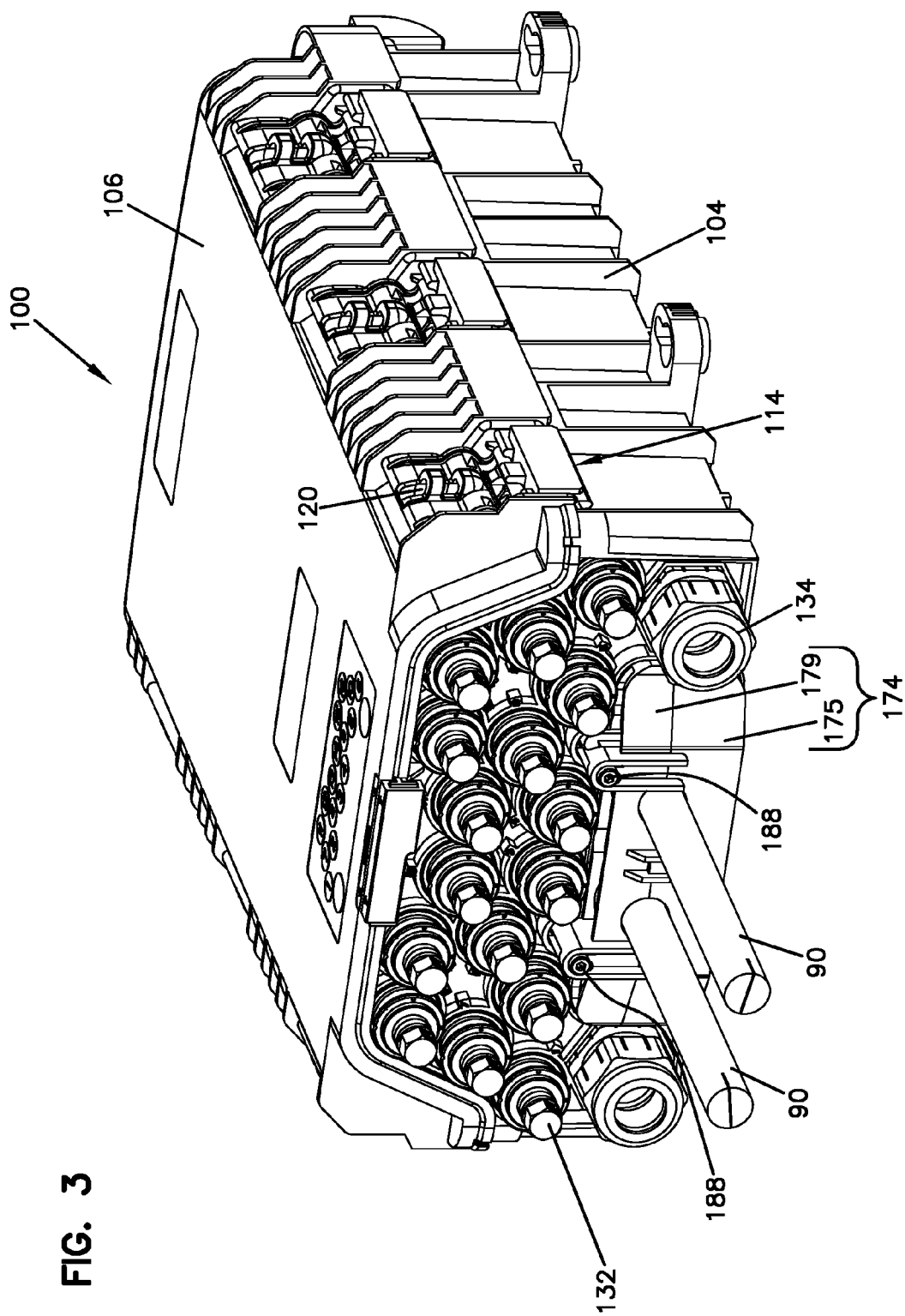
FIG. 3 is a perspective view of the enclosure system of FIG. 1 arranged in a closed position.

FIGS. 2 and 3 illustrate the enclosure system 100 of FIG. 1. In particular, FIG. 2 is a perspective view of the enclosure system 100 of FIG. 1 arranged in an open position. FIG. 3 is a perspective view of the enclosure system 100 of FIG. 1 arranged in a closed position. As depicted, the base 104 and the cover 106 are coupled together by a hinge 110 on a first side 112 of the enclosure 102. The cover 106 can be pivoted about the hinge 110 between an open position (FIG. 2) and a closed position (FIG. 1). In the open position, the chamber 108 defined by the enclosure 102 is opened, allowing access for organizing or splicing optical fibers in the chamber 108. In the closed position, the interface between the base 104 and the cover 106 may be environmentally sealed so as to provide a sealed space for splices of optical fibers therein.

The cover 106 is also coupled to the base 104 with one or more latches or clamps 114 on opposite lateral sides 116 of the enclosure 102. The cover 106 may be secured in the closed position by the latches 114. In some examples, the latches 114 are latch-type toggle clamps. For example, each of the latches 114 includes a toggle latch assembly 120 and a latch strike 122. The toggle latch assembly 120 includes a latch lever arm and a hook. The latch strike 122 includes a projection or tab with which the hook of the toggle latch assembly 120 is engaged when the latch 114 is in a closed position. In some examples, the toggle latch assembly 120 is arranged on opposite lateral sides 124 of the cover 106 while the latch strike 122 is formed on opposite lateral sides 126 of the base 104. The configuration is advantageous over a structure where the toggle latch assembly 120 is fixed on the base 104 and the latch strike 122 is formed on the cover 106. This is because the latch assembly 120 is typically more vulnerable to damage or breakage than the latch strike 122, and the latches 114 are easily replaceable, when damaged, by replacing the cover 106, instead of the base 104 that incorporates most components of the enclosure system 100.

As depicted, the enclosure system 100 further includes a drawer 130, a plurality of fiber optic adaptors 132, one or more cable ports 134 (e.g., gland style cable pass-through ports), and one or more splice trays 136.

The drawer 130 operates to route the main optical fiber cable 90 within the drawer and introduce the main optical fiber cable 90 into the enclosure chamber 108. The drawer 130 is configured to be removably inserted into the enclosure chamber 108. In some examples, the drawer 130 is inserted through an end plate 162 of the base 104. For example, as shown in FIG. 1, the end plate 162 includes an insert hole 164 configured to receive the drawer 130 therethrough. The drawer 130 is described in further detail with reference to FIG. 5.

Figure 4B:
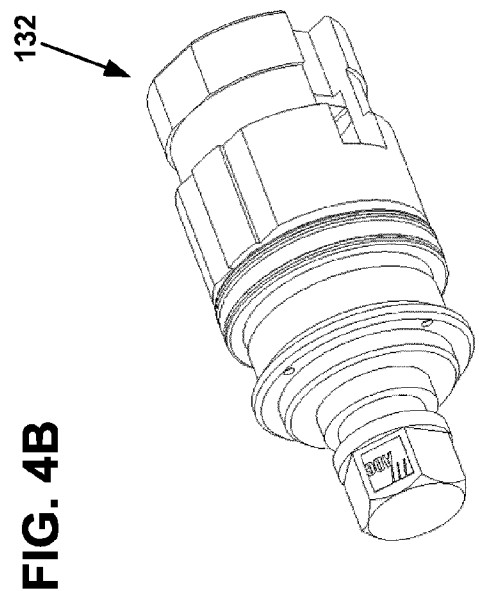
FIG. 4B is a perspective view of another exemplary fiber optic adaptor.
Figure 4A:
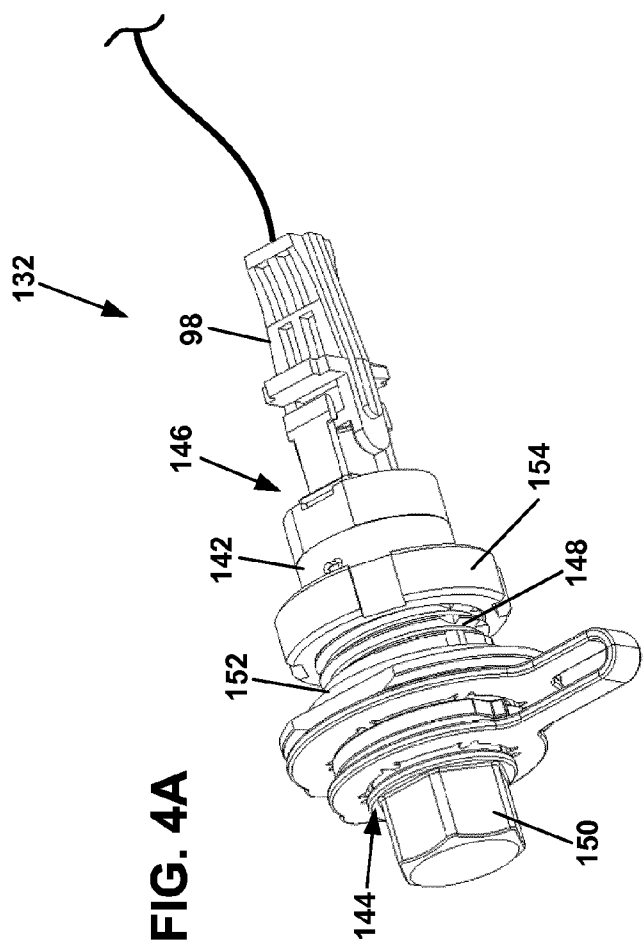
FIG. 4A is a perspective view of an exemplary fiber optic adaptor.

The fiber optic adaptors 132 operate to connect one or more drop cables 92 to one or more fibers of the main cable 90. In some examples, the fiber optic adaptors 132 are arranged on the end plate 162 of the base 104. As shown in FIG. 4A, in some examples, each fiber optic adaptor 132 includes a body 142, a front end connector 144, a back end connector 146, a threaded portion 148, a cap 150, an O-ring 152, and a nut 154 mounted on the threaded portion 148. A plurality of adaptor mounting openings may be formed to extend through the end plate 162 so that each opening supports the body 142 of the fiber optic adaptor 132. When the fiber optic adaptor 132 is engaged with the adaptor mounting opening, the nut 154 is fastened onto the threaded portion 148 to secure the body 142 to the adaptor mounting opening, and the O-ring 152 is seated against the end plate 162 and extends around the adaptor mounting opening, thereby forming an environmental seal about the fiber optic adaptor 132. In other examples, any types of elastomeric seals can be used for sealing the fiber optic adaptors 132 relative to the enclosure 102.

The cap 150 is configured to protect the front end connector 144 in a closed position and open the front end connector 144 in an open position. When the fiber optic adaptor 132 is not in use, the cap 150 sealingly closes the front end connector 144. In some examples, the cap 150 is configured as a plug engaged into a port of the front end connector 144.

The front end connector 144 is configured to be connected to the drop cable 92 outside the enclosure 102. For example, the front end connector 114 provides a first port for receiving the connectorized end of the drop cable 92. The back end connector 146 is configured to be connected to a fiber optic pigtail 98 within the enclosure chamber 108. For example, the back end connector 146 provides a second port for receiving the connectorized end of the fiber optic pigtail 98.

In some examples, the front end connectors (the first ports) 144 of the fiber optic adaptors 132 are configured to couple with hardened fiber optic connectors, which are also referred to herein as ruggedized connectors. Examples of hardened connectors and adaptors are described in U.S. Pat. Nos. 8,556,520, 6,899,467, 7,785,015, 7,264,402, and 7,744,288. The entireties of these patents are hereby incorporated by reference. Such hardened fiber optic connectors are environmentally sealed relative to the fiber optic adaptors by elastomeric seals. The hardened fiber optic connectors are secured within the first port by hardened fasteners such as threaded couplers or bayonet-style couplers.

In some examples, the back end connectors (the second port) 146 of the fiber optic adaptors 132 are configured to couple with non-hardened fiber optic connectors, such as standard SC or LC connectors.

In this example, the fiber optic adaptors 132 may integrate different footprints for different types of fiber optic connectors. Examples of such fiber optic connectors include the DLX™ Fiber Optic Connector System available from TE Connectivity and OptiTap® connectors available from Corning Corporation. For example, FIG. 4B shows another exemplary fiber optic adaptor suitable for the system 100.

The cable ports 134 operate to receive additional cables, such as the branch cables, into the enclosure chamber 108 therethrough. In the depicted example, the cable ports 134 are arranged on the end plate 162 of the base 104. In some examples, the branch cable is inserted into the chamber 108 through the cable port 134 and spliced to the main optical fiber cable 90 at one or more of the splice trays 136.

The splice trays 136 operate to provide a space for splicing optical fibers. In some examples, the splice trays 136 are arranged on a tray tower 220. The tray tower 220 is described in further detail with reference to FIG. 12.

When the optical fiber main cable 90 is inserted within the enclosure chamber 108, a section of the jacket of the main cable 90 is removed to expose a bundle of buffer tubes containing optical fibers. To terminate the drop cable(s) and/or the branch cable(s) to one or more of the optical fibers of the main cable 90, the enclosure 102 is opened and retained in the open position to provide access to the splice trays 136.

The branch cable is trimmed and inserted into the enclosure chamber 108 through the cable port 134. An installer can select and sever a corresponding fiber from a selected buffer tube of the main cable 90. The cut fiber of the main cable 90 is routed to the branch fiber on one of the splice trays 136 and suitably spliced (e.g., fused or mechanically spliced) to the fiber of the main cable 90. The splice formed thereby may be mounted in the splice tray 136.

The drop cable 92 may be optically connected to the main cable 90 in several ways. For example, the drop cable 92 can be connected to the main cable 90 through a splitter module 94. The splitter module 94 is used to splice a fiber of the main cable 90 to multiple drop cables 92. The splitter module 94 may include a splitter 95, a splitter input fiber 96 and a plurality of splitter output pigtails 98. The splitter input fiber 96 is configured to be optically connected to an optical fiber from the main cable 90 that provides input signals to the splitter 95. The splitter 95 is configured to split the input signals. In some examples, the splitter 95 is a passive optical power splitter. In other examples, the splitter 95 can include a wavelength division multiplexer. The splitter output pigtails 98 are configured to receive the split input signals. The splitter output pigtails have connectorized ends configured to be received within the back end connectors 146 of the fiber optic adaptors 132.

For example, the splitter 95 optically couples the splitter input fiber 96 to the plurality of splitter output pigtails 98. A selected fiber of the main cable 90 is spliced to the splitter input fiber 96 of the splitter module 94 disposed within the enclosure 102. The splitter input fiber 96 may be routed to one of the splice trays 136 at which an unconnectorized end of the splitter input fiber 96 is spliced to the selected fiber of the main cable 90. The splitter output pigtails 98 are routed, and connectorized ends of the splitter output pigtails are plugged into the back end connectors 146 of the fiber optic adaptors 132, respectively. By plugging a connectorized end (or ruggedized connector end) of the drop cable 92 into the front end connector 144 of one of the fiber optic adaptors 132, the drop cable 92 is optically connected to the corresponding fiber of the main cable 90.

Alternatively, the drop cable 92 can be directly connected to the main cable 90. For example, a feeder fiber of the main cable 90 is spliced to an unconnectorized end of the drop cable 92.

In some cases, the installer may sever a buffer tube or a fiber of the main cable 90 and splice the fiber as described above while leaving one or more of the other buffer tubes or fibers of the buffer tube from which the fiber is separated uncut (i.e., the remaining fibers of the buffer tube or ribbon remain intact and are expressed).

The foregoing procedures can be used to splice additional drop cables to the main cable 90. While the splice is described above with respect to a single branch or drop fiber, the branch or drop cable may include multiple fibers that may be spliced to multiple ones of the main cable fibers, individually or as a mass splice. Multiple branch or drop cables may be spliced to the main cable fibers.

Figure 5:
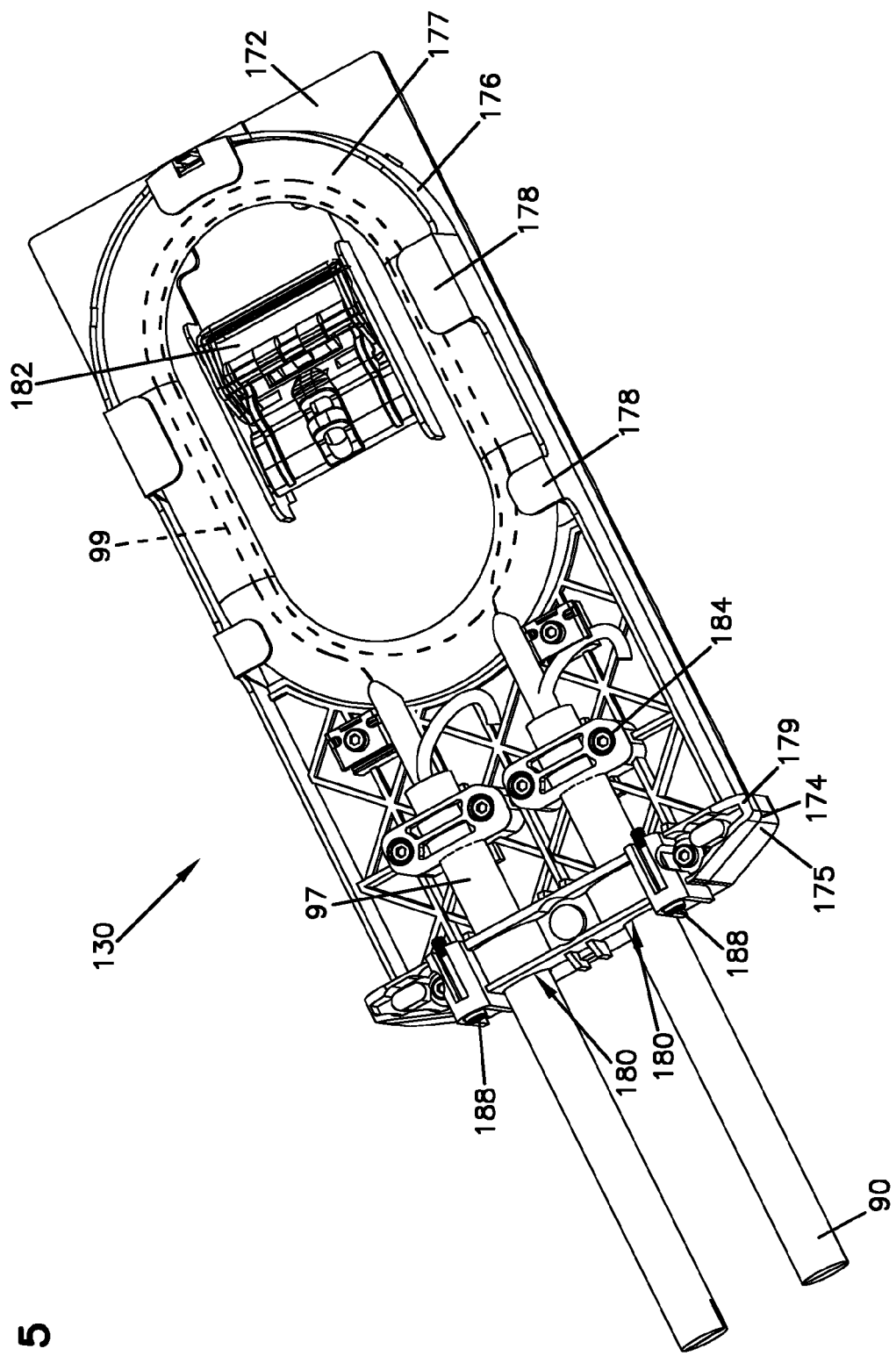
FIG. 5 is a top perspective view of an exemplary drawer.
Figure 6:
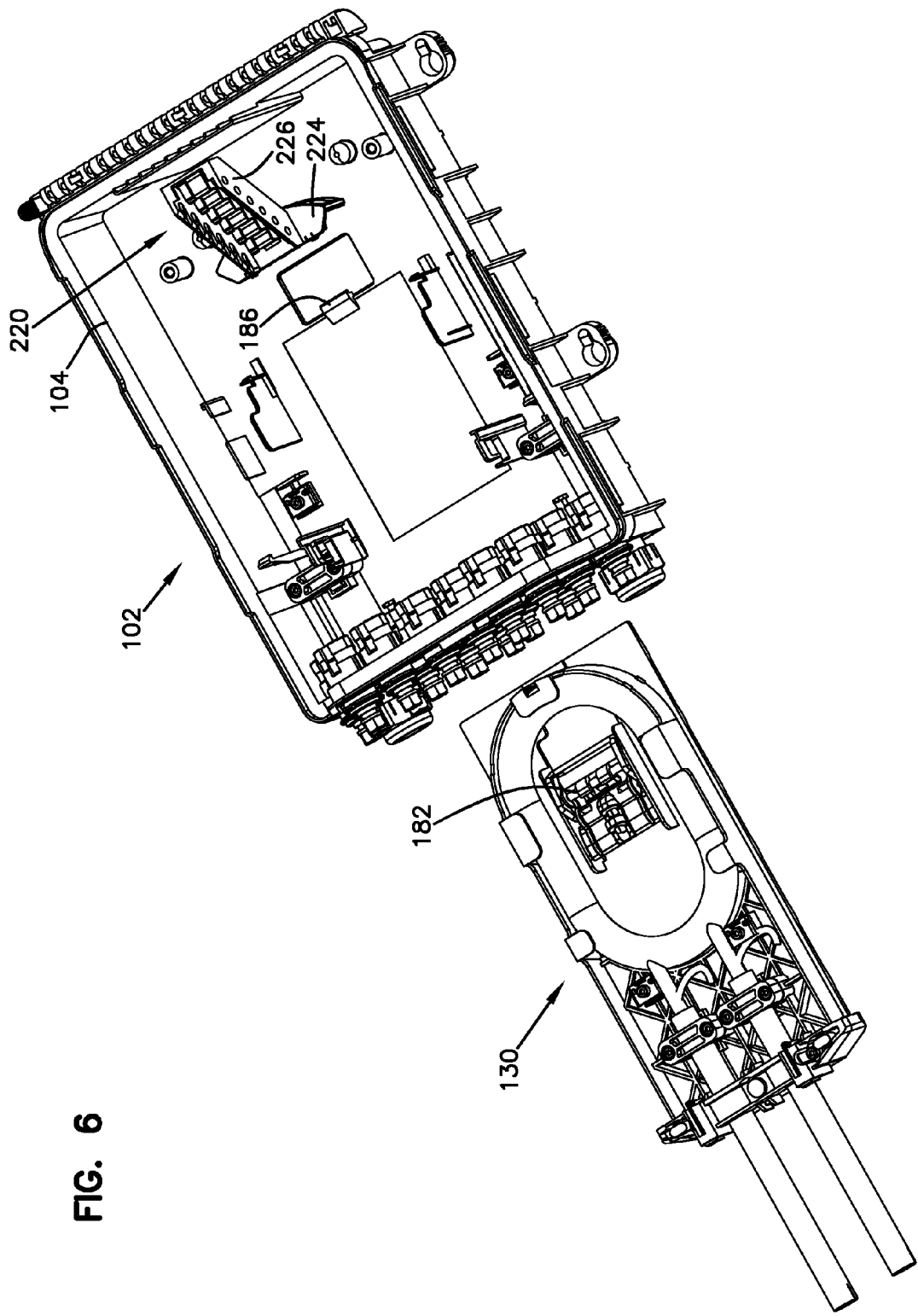
FIG. 6 illustrates the drawer that is disassembled from the base.
Figure 7:
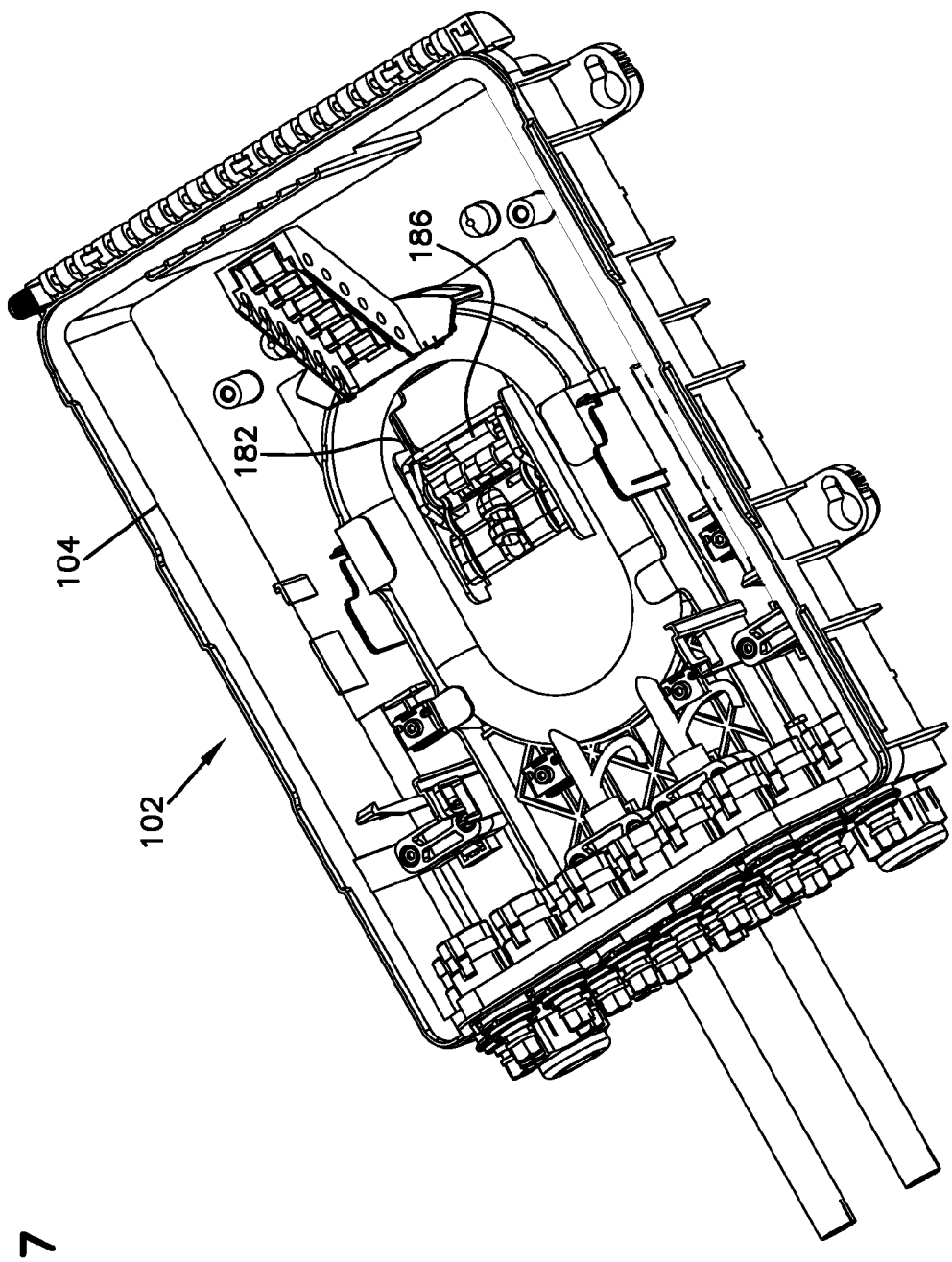
FIG. 7 illustrates the drawer that is assembled to the base.

FIGS. 5, 6, and 7 illustrate a drawer 130 according to one example of the present disclosure. In particular, FIG. 5 is a top perspective view of an exemplary drawer 130. FIG. 6 a top perspective view of the system 100 with the cap 106 removed, illustrating the drawer 130 that is disassembled from the base 104. FIG. 7 is a top perspective view of the system 100 with the cap 106 removed, illustrating the drawer 130 that is assembled to the base 104. The drawer 130 includes a base plate 172 and a face plate 174. In some examples, the drawer 130 further includes a drawer latch assembly 182 and one or more cable anchoring devices 184.

The base plate 172 includes a fiber loop guide 176 and one or more guide tabs 178. The loop guide 176 defines a fiber management loop 177 at which an unjacketed portion 99 of the main cable 90 can be stored in a looped configuration. The fiber management loop 177 is configured to route the main cable 90 therealong on the base plate 172, thereby neatly organizing the cable slack and ensuring that a minimum bend radius is not exceeded. The guide tabs 178 is formed on the top edge of the loop guide 176 and configured to contain the cable slack behind the guide tabs 178.

The face plate 174 includes a plurality of main cable ports 180 through which the main cable 90 is received onto the base plate 172. In the depicted example, the face plate 174 has two main cable ports 180. The face plate 174 is configured and dimensioned to engage the insert hole 164 of the end plate 162 of the base 104. In some examples, the face plate 174 and/or the end plate 162 include a sealing member configured to environmentally seal the enclosure chamber 108 when the drawer 130 is inserted into the enclosure 102 and the face plate 174 is engaged with the insert hole 164 of the end plate 162.

The drawer latch assembly 182 operates to secure the drawer 130 to the base 104. In some examples, the drawer latch assembly 182 is arranged on the base plate 172 and configured to be coupled to a drawer latch tab 186 formed on the bottom surface of the base 104. The drawer latch assembly 182 is configured to apply spring load to the sealing member between the face plate 174 and the end plate 162, thereby activating the sealing member therebetween. For example, when engaged with the drawer latch tab 186, the drawer latch assembly 182 may operate to pressurize the face plate 174 of the drawer 130 onto the end plate 162 by spring force so that the sealing member engaged between the face plate 174 and the end plate 162 remains compressed therebetween. Such a pressurized or compressed sealing member can also compensate any deformation or shrinkage thereof that may have occurred over time. In addition, or alternatively, the face plate 174 includes a fastening device 188 (See also FIG. 3) configured to be coupled to the end plate 162 of the base 104 with any suitable fasteners.

The anchoring device 184 (e.g., a clamp) operates to grip a portion of the main cable 90 and secure the main cable 90 onto the drawer 130. The anchoring device 184 is arranged close to the main cable ports 180 so that the main cable 90 passing through the main cable ports 180 are retained and supported by the anchoring device 184. The anchoring device 184 is described in further detail with reference to FIGS. 12-14.

The drawer 130 allows an installer to organize the main cable 90 outside the enclosure chamber 108, thereby providing enough space for installation of the main cable 90. Thus, the installer can easily route the main cable 90 on the drawer 130 and insert the drawer 130 into the enclosure chamber 108. For example, the installer can anchor a jacketed portion 97 of the main cable 90 at the anchoring device 184 on the drawer 130 and store the unjacketed portion 99 of the main cable 90 at the fiber management loop 177 of the loop guide 176 before inserting the drawer 130 into the enclosure chamber 108.

In other words, the installer removes a portion of the jacket from a cable to provide an intermediate unjacketed section of the cable, which includes exposed buffer tubes containing optical fibers. The jacketed ends 97 of the cable 90 on opposite ends of the unjacketed section 99 of the cable 90 are clamped or anchored to the drawer 130 through the anchoring device 184. The intermediate unjacketed section 99 of the cable 90 is coiled and stored in the looped configuration at the fiber management loop 177 of the drawer 130. Thus, the unjacketed portion 99 of the cable 90 is wrapped in a plurality of loops when stored in the looped configuration. In this disclosure, the intermediate unjacketed section of the cable can also be referred to as an unjacketed span of the cable that extends between the jacketed ends of the cable.

As such, the drawer 130 provides a bigger loop entrance and allows complete loop preparation outside the enclosure 102. Thus, the installation of the main cable 90 is easier and faster with the drawer 130. The drawers 130 can also reduce risk of damages to the fibers or other components inside the enclosure 102.

As shown in FIGS. 3 and 5, the face plate 174 has a wrap-around configuration for allowing the main cable 90 to be laterally inserted in the main cable ports 180. In the depicted examples, the face plate 174 includes a lower plate part 175 and an upper plate part 179. The lower plate part 175 may be connected to, or integrally formed with, the base plate 172. The upper plate part 179 may be joined to the lower plate part 175 by clamps or other retainers or fasteners. The main cable ports 180 are defined when the lower plate part 175 and the upper plate part 179 are connected to form the face plate 174. The face plate 174 also includes a wrap-around sealing configuration engaged between the lower plate part 175 and the upper plate part 179 to provide seals around the cable ports defined by the lower and upper plate parts 175 and 179. Such a wrap-around sealing can include sealing blocks that are similar to ones described below with reference to FIGS. 18 and 19.

In some examples, the cable ports 134 (e.g., gland style cable pass-through ports) may have a wrap-around configuration for allowing a branch cable or gland style cable to be laterally inserted in the cable ports 134. For example, corners of the base 104 adjacent the cable ports 134 may be configured as separate parts that are detachable from the base 104. The separate part is removed from the corner of the base 104 to lay a cable onto a portion of the cable port 134 formed on the base 104, and then coupled to the corner of the base 104. The separate parts are configured to form a portion of the cable ports 134 so that the cable ports 134 are defined when the parts are engaged with the base 104.

Figure 8:
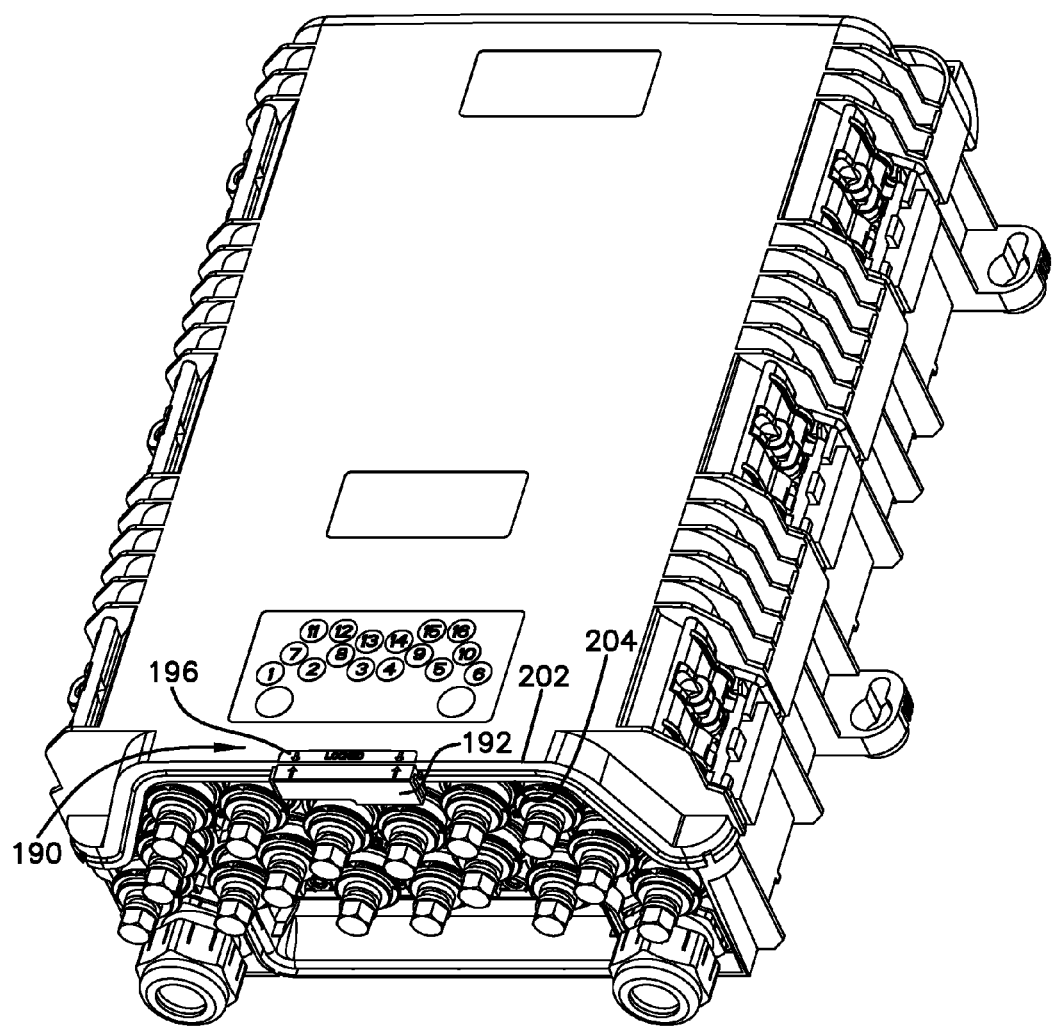
FIG. 8 illustrates an exemplary sliding lock in an open position.
Figure 9:
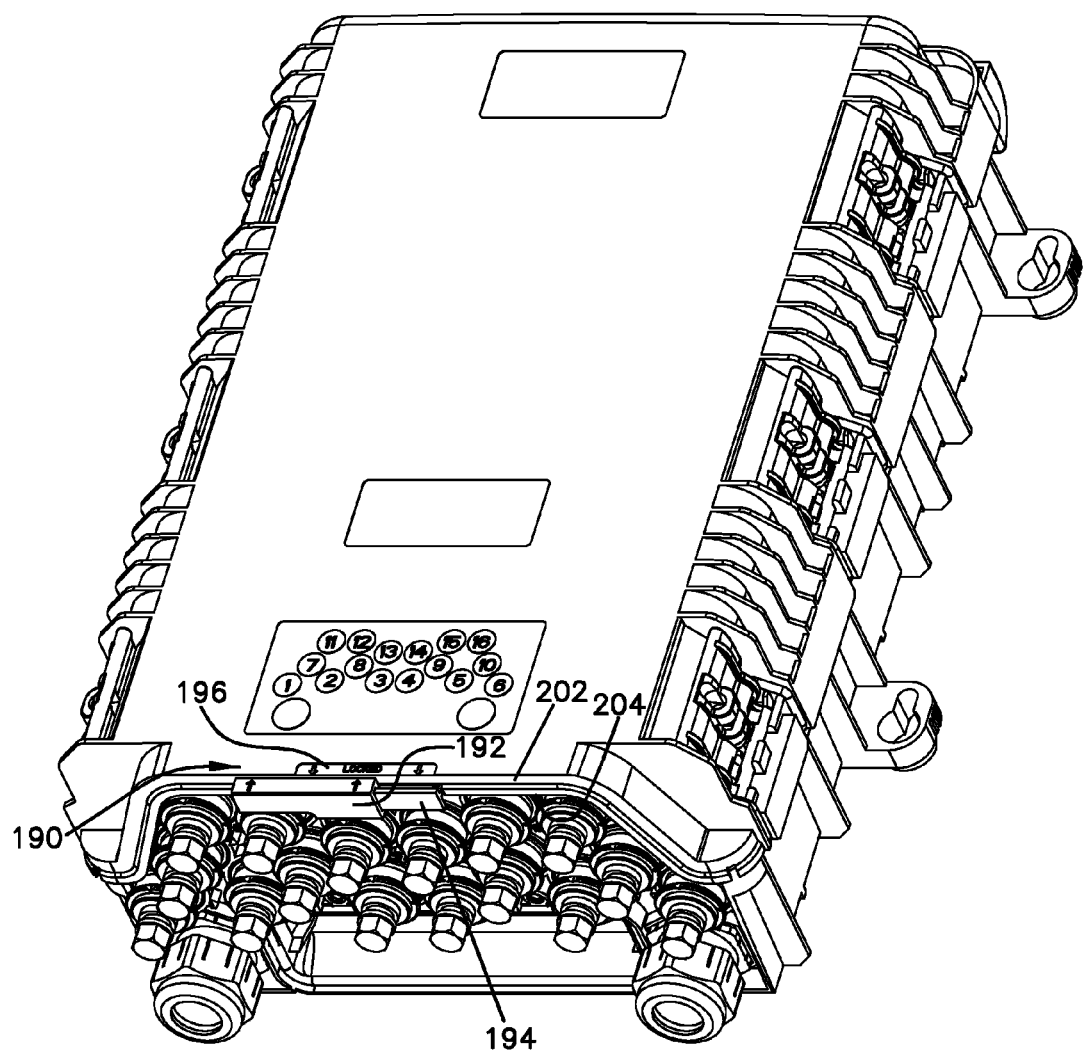
FIG. 9 illustrates the sliding lock of FIG. 8 in a closed position.

FIGS. 8 and 9 illustrate an exemplary tool-less sliding lock 190. In particular, FIG. 8 illustrates an exemplary tool-less sliding lock 190 in an open position, and FIG. 9 illustrates the sliding lock 190 of FIG. 8 in a closed position. The sliding lock 190 operates to secure the cover 106 to the base 104, in addition to the latches 114. The sliding lock 190 replaces fasteners, such as screws, and can thus secure the cover 106 to the base 104 without a tool or instrument such as a screw driver and ease a process of coupling the cover 106 to the base 104. The sliding lock 190 improves an environmental sealing between the cover 106 and the base 104 at a bottom edge 202 of the cover 106 and a bottom edge 204 of the base 104. The sliding lock 190 includes a sliding bar 192 and a locking tab 194. In some examples, the sliding lock 190 further includes a position indicator 196.

In some examples, the sliding bar 192 is formed on the cover 106 and the locking tab 194 is formed on the base 104. For example, the sliding bar 192 is arranged at the bottom edge 202 of the cover 106 and configured to slide along the edge 202. The locking tab 194 is formed at the bottom edge 204 of the base 104 (in particular, an exposed peripheral edge of the end plate 162). The sliding bar 192 is configured to engage the locking tab 194 when the cover 106 and the base 104 are in the closed position, in which the bottom edge 202 of the cover 106 is abutted to the bottom edge 204 of the base 104.

As the cover 106 is pivoted about the hinge 110 to be in the closed position, the sliding lock 190 is in the open position, as shown in FIG. 8. In the open position of the sliding lock 190, the bottom edge 202 of the cover 106 can be abutted to the bottom edge 204 of the base 104. In some examples, the base 104 and/or the cover 106 includes a sealing member on or around the bottom edges 202 and 204 so as to environmentally seal the enclosure 102. Once the base 104 and the cover 106 are in the closed position while the sliding lock 190 is in the open position, the sliding bar 192 can be slid along the bottom edges 202 and 204. As the sliding bar 192 slides, the sliding bar 192 engages the locking tab 194. When the sliding bar 192 is slid to fully engage the locking tab 194, the sliding lock 190 is in the closed position, as shown in FIG. 9.

The position indicator 196 is arranged adjacent the sliding bar 192 and operates to indicate whether the sliding lock 190 is in the open or closed position, depending on a relative position of the sliding bar 192.

Figure 10:
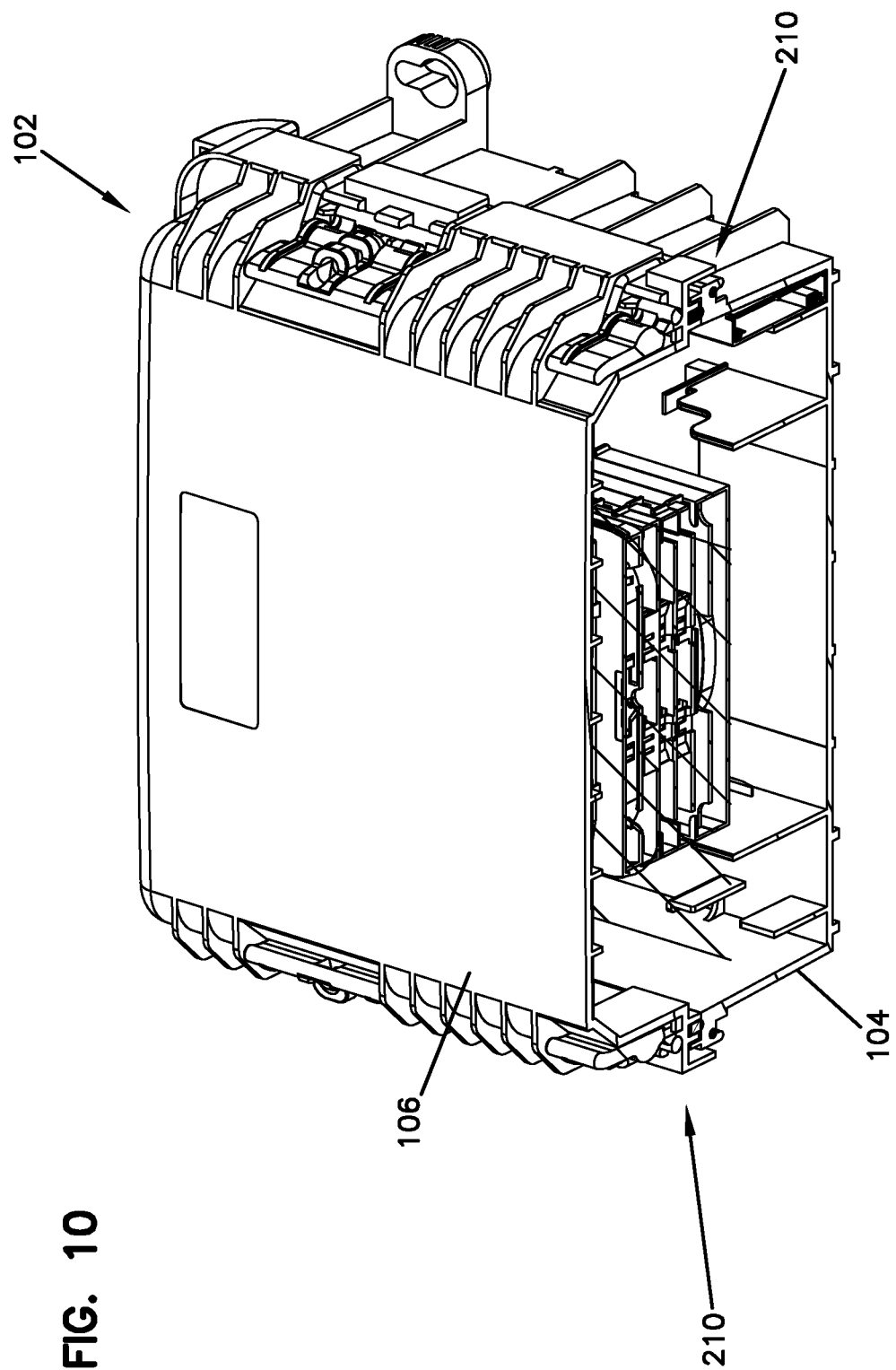
FIG. 10 is a perspective, cross-sectional view of the enclosure, illustrating an exemplary sealing mechanism of the enclosure.
Figure 11:
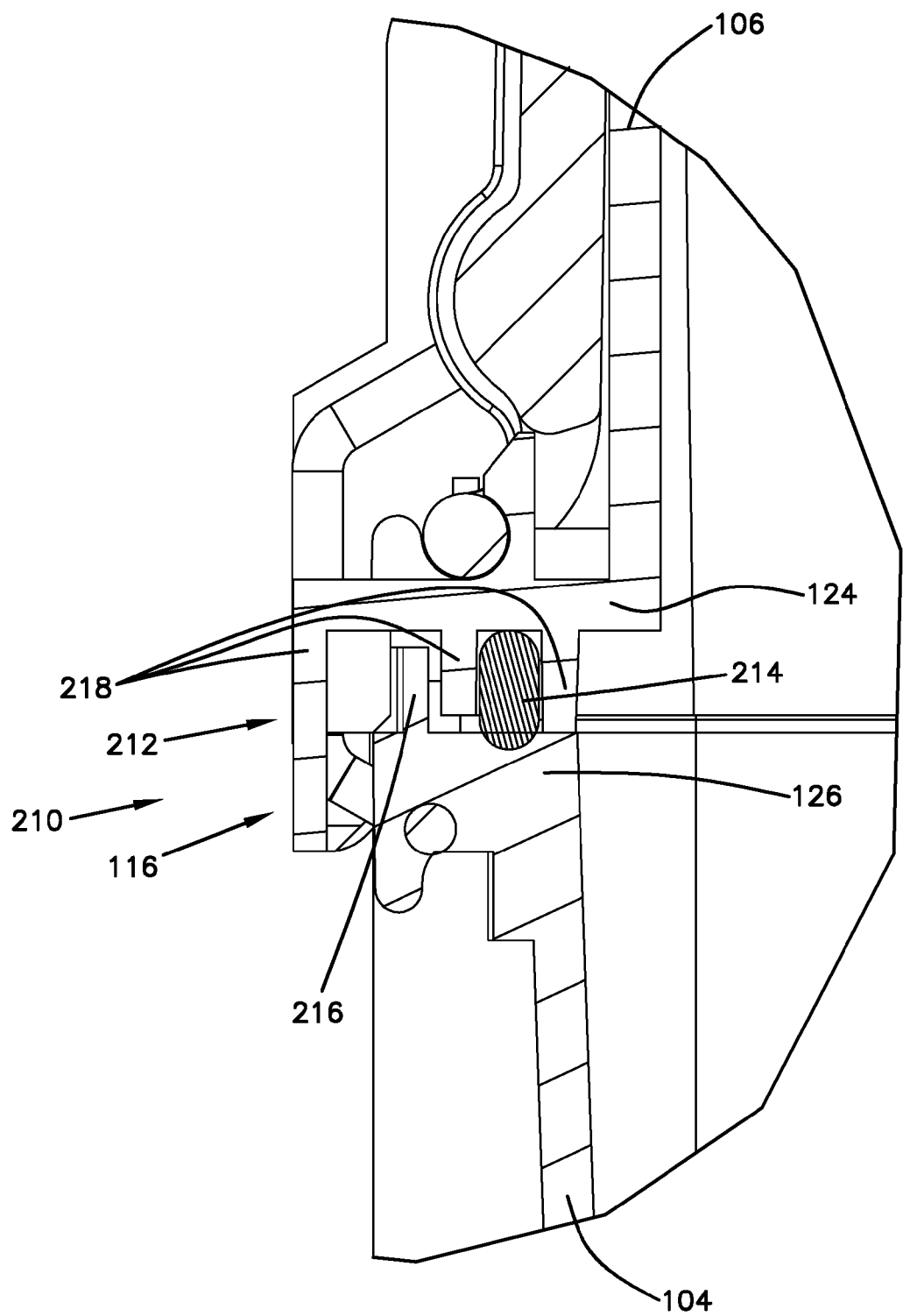
FIG. 11 is an enlarged view of the sealing mechanism of FIG. 10.

FIGS. 10 and 11 illustrate a sealing mechanism 210 of the enclosure 102 according to one example of the present disclosure. In particular, FIG. 10 is a perspective, cross-sectional view of the enclosure 102, illustrating an exemplary sealing mechanism 210 of the enclosure 102. FIG. 11 is an enlarged view of the sealing mechanism 210 of FIG. 10. In some examples, the sealing mechanism 210 includes a labyrinth seal 212 and a gasket seal 214.

The labyrinth seal 212 is formed at the opposite lateral sides 116 of the enclosure 102. For example, the labyrinth seal 212 is defined by a peripheral edge of the base 104 and a peripheral edge of the cover 106. In some examples, the base 104 includes one or more projections 216 and one or more grooves defined by the projections 216. The projections 216 and the corresponding grooves are formed on the peripheral edge of the lateral side 126 of the base 104. Similarly, the cover 106 includes one or more projections 218 and one or more grooves defined by the projections 218. The projections 218 and the corresponding grooves are formed on the peripheral edge of the lateral side 124 of the cover 106. The projections 216 and the corresponding grooves of the base 104 are complimentary to the projections 218 and the corresponding grooves of the cover 106, thereby defining the labyrinth seal 212.

In some examples, the sealing mechanism 210 may further include the gasket seal 214. As depicted, the gasket seal 214 is engaged between the peripheral edges of the lateral sides 126 and 124 of the base 104 and the cover 106.

As such, the sealing mechanism 210 prevents invasion of dust and/or water into the enclosure 102, thereby improving sealing performance.

Figure 12A:
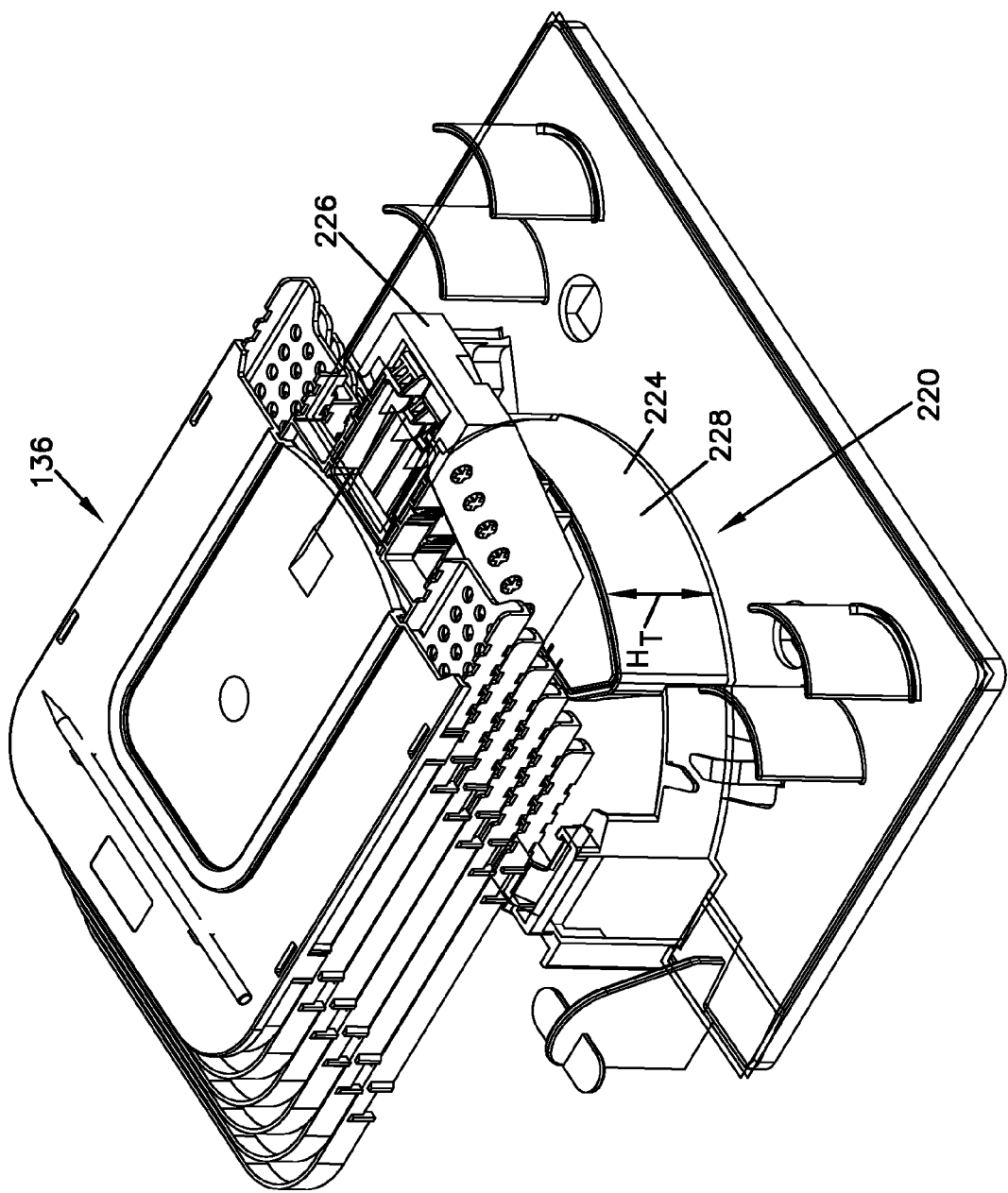
FIG. 12A illustrates an exemplary splice tray tower.

FIG. 12A illustrates an exemplary splice tray tower 220. The splice tray tower 220 is also described in FIGS. 6 and 7. In some examples, the splice tray tower 220 is formed on a tray plate 222 configured to be assembled onto the inner bottom surface of the base 104. In other examples, the splice tray tower 220 is formed directly onto the inner bottom surface of the base 104 (FIGS. 6 and 7).

The tray tower 220 is configured to receive an end portion of the drawer 130 and pivotally mount the splice trays in a raised position from the tray plate 222 or the inner bottom surface of the base 104. For example, the tray tower 220 has a shape complementary to the end portion of the drawer 130. The tray tower 220 is configured to mount the trays 136 and provides a clearance gap between the trays 136 and the inner bottom surface of the base 104 for receiving the drawer 130. In some examples, the tray tower 220 includes a curved base 224 and a tower ladder 226. The curved base 224 is configured to receive the rounded forward portion of the drawer 130 at an inner side thereof and raise the splice trays 136 from the tray plate 222. The curved base 224 has a height ($H_T$) from the tray plate 222, and the height ($H_T$) corresponds to a height of the drawer 130 (including the intermediate unjacketed section 99 of the cable 90 stored at the fiber management loop 177 of the drawer 130) at the forward portion of the drawer 130.

The curved base 224 also provides a curved routing guide 228 along its outer surface. The curved outer surface of the routing guide 228 is configured to route cables therealong to organize the cables and ensure that a minimum bend radius is not exceeded.

The tower ladder 226 is configured to pivotally mount the plurality of splice trays 136 thereon to cantilever therefrom.

Figure 12B:
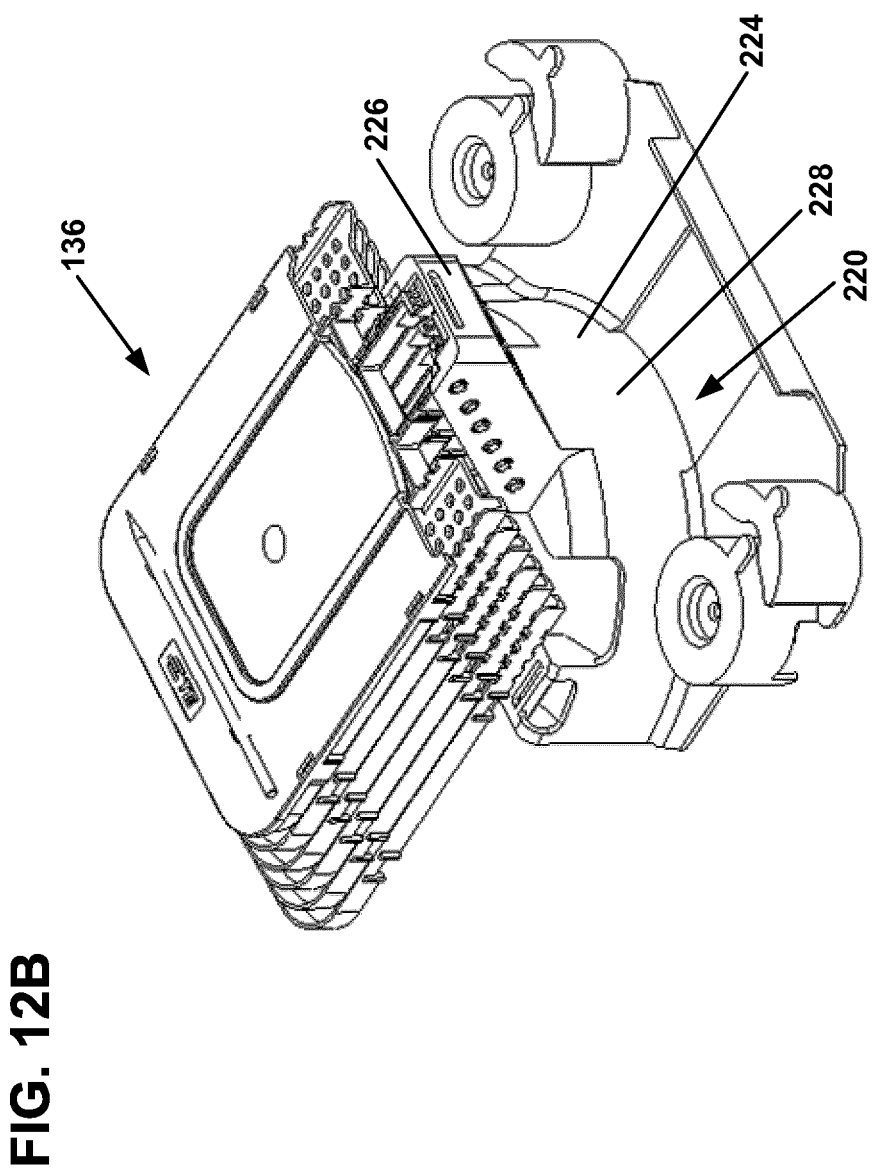
FIG. 12B illustrates another exemplary splice tray tower.

FIG. 12B illustrates another exemplary splice tray tower 220. As many of the concepts and features are similar to the first example shown in FIG. 12A, the description for the tray tower 220 in this example is omitted for brevity purposes.

Figure 13:
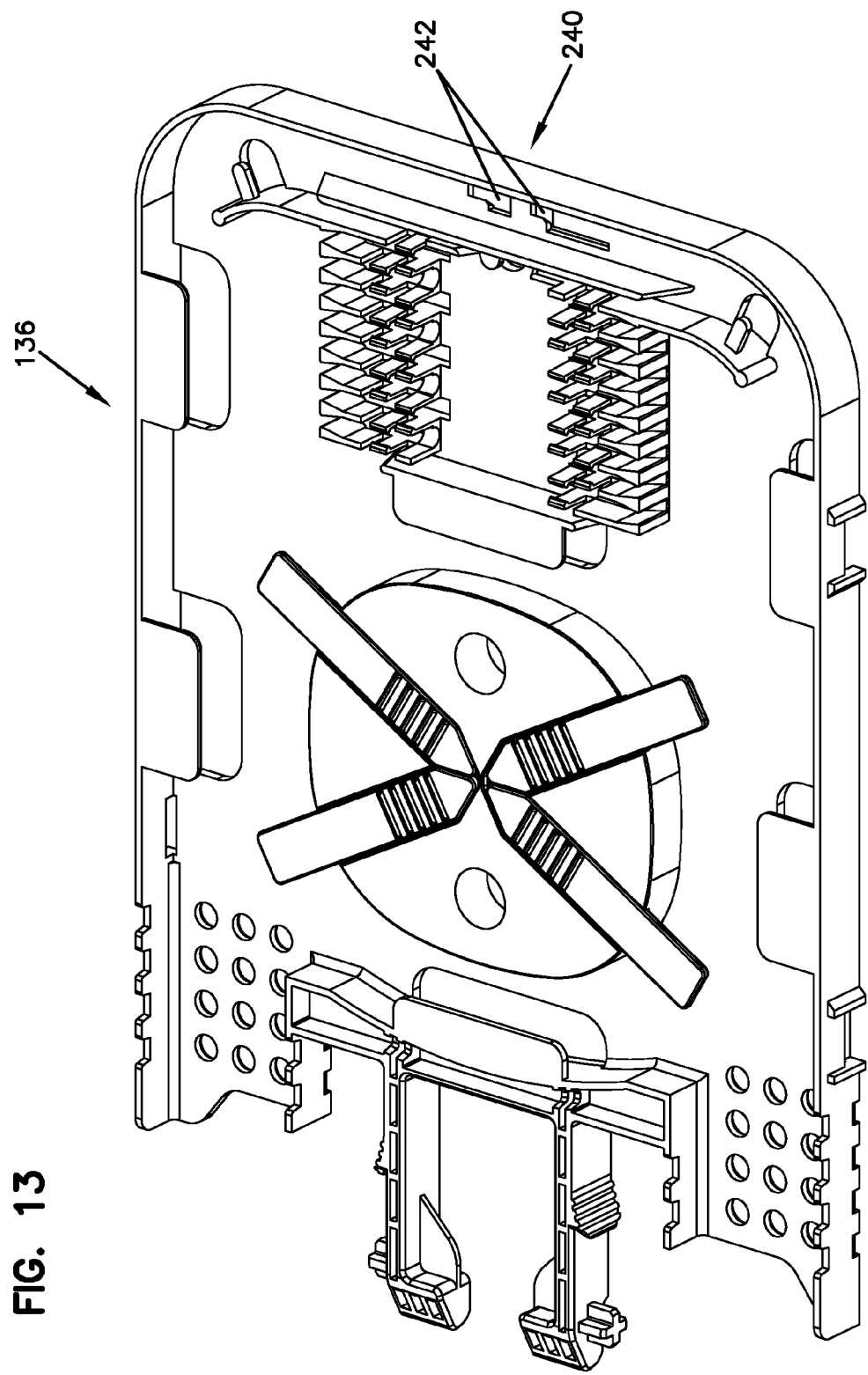
FIG. 13 illustrates an exemplary splice tray.

FIG. 13 illustrates an exemplary splice tray 136. The splice tray 136 includes a splitter engaging area 240. The engaging area 240 operates to secure a splitter in place. In some examples, the engaging area 240 includes one or more grooves 242 corresponding to tabs or projections formed on the splitter. The splitter engaging area 240 is provided if additional splitters are desired to be added later to increase the capacity of the enclosure, such as to provide more outputs.

Figure 14:
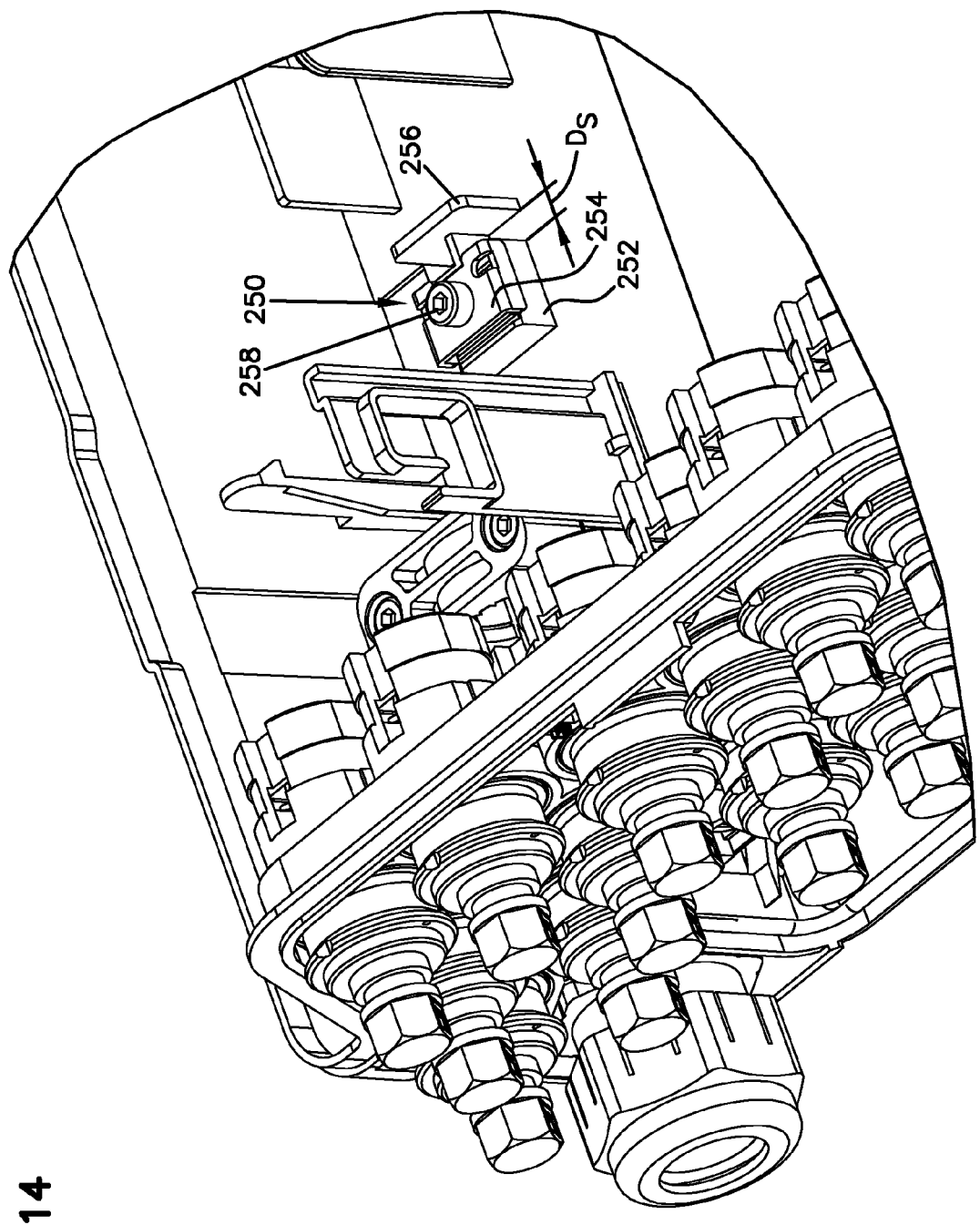
FIG. 14 illustrates an exemplary cable stop.

FIG. 14 illustrates an exemplary cable stop 250. The cable stop 250 operates to limit the extension of a strength member of a cable out of the cable jacket. For example, a branch cable can be routed within the enclosure through the cable port 134 (e.g., a gland-type cable port), and engaged with the cable stop 250.

The cable stop 250 includes a stop base 252, a clamping cover 254, and a stop wall 256. In some examples, an unconnectorized end of a cable is placed on the stop base 252 and covered by the clamping cover 254. The clamping cover 254 can be fastened to the stop base 252 by any type of fasteners 258, such as screws. The stop wall 256 is arranged adjacent the stop base 252 and spaced apart from the stop base 252 at a distance ($D_S$).

When the cable is cut or trimmed at its end, the cable exposes one or more strength members or fiber reinforcing rods that extend through the cable. The strength members or rods can have a rigid construction and can be formed of epoxy reinforced fiber glass rovings.

As the cable is bent, the strength members extend out of the cut end of the cable. The cut end of the cable is clamped on the stop base 252 by the clamping cover 254, allowing the strength member to grow out of the cable toward the stop wall 256. The stop wall 256 operates to limit the extension of the strength member within the distance ($D_S$) and prevent the strength member from being extended over the stop wall 256, thereby protecting other components in the enclosure 102 from the extended strength member of the cable.

Figure 15:
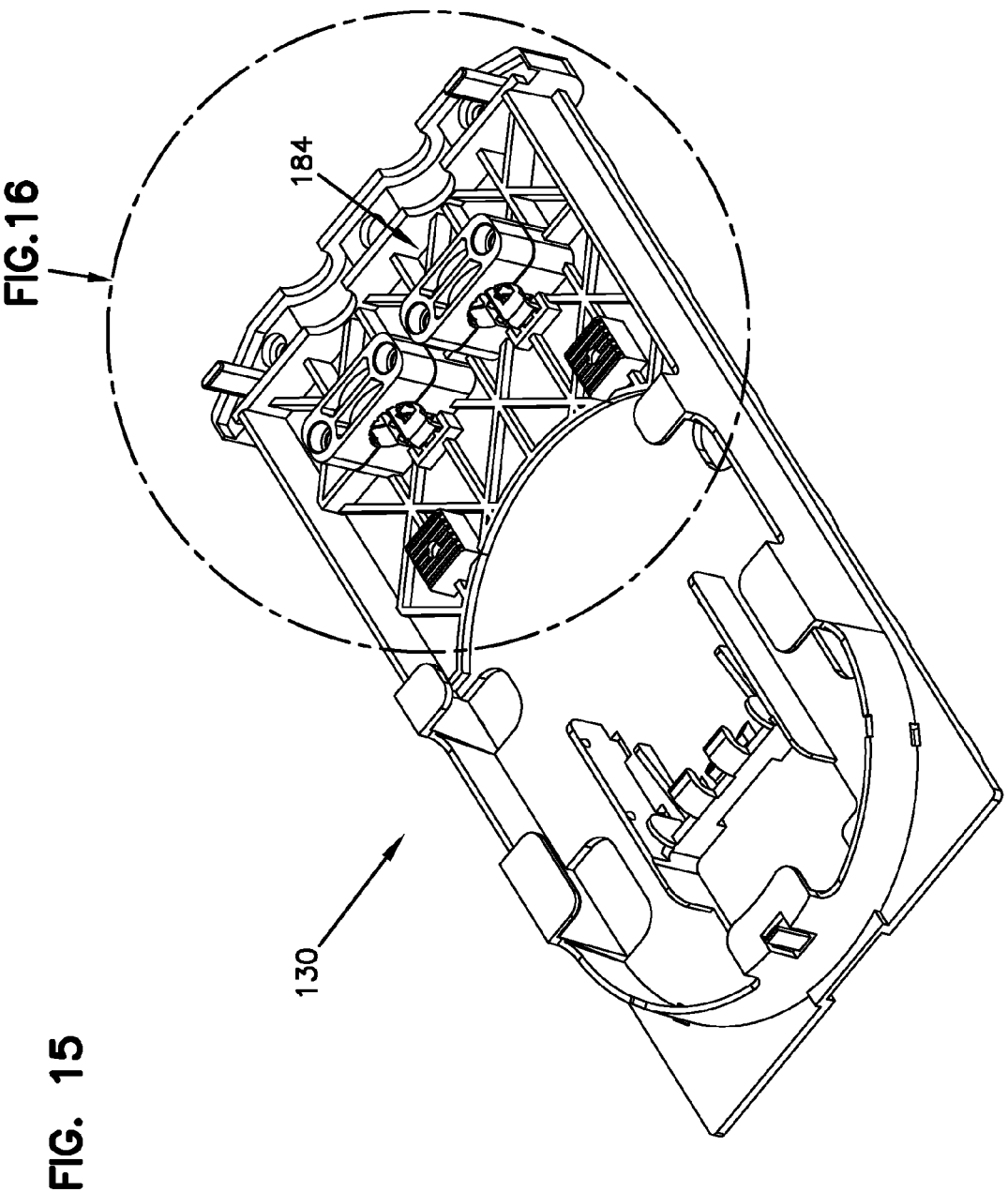
FIG. 15 is an exemplary anchoring device formed on the drawer.
Figure 16:
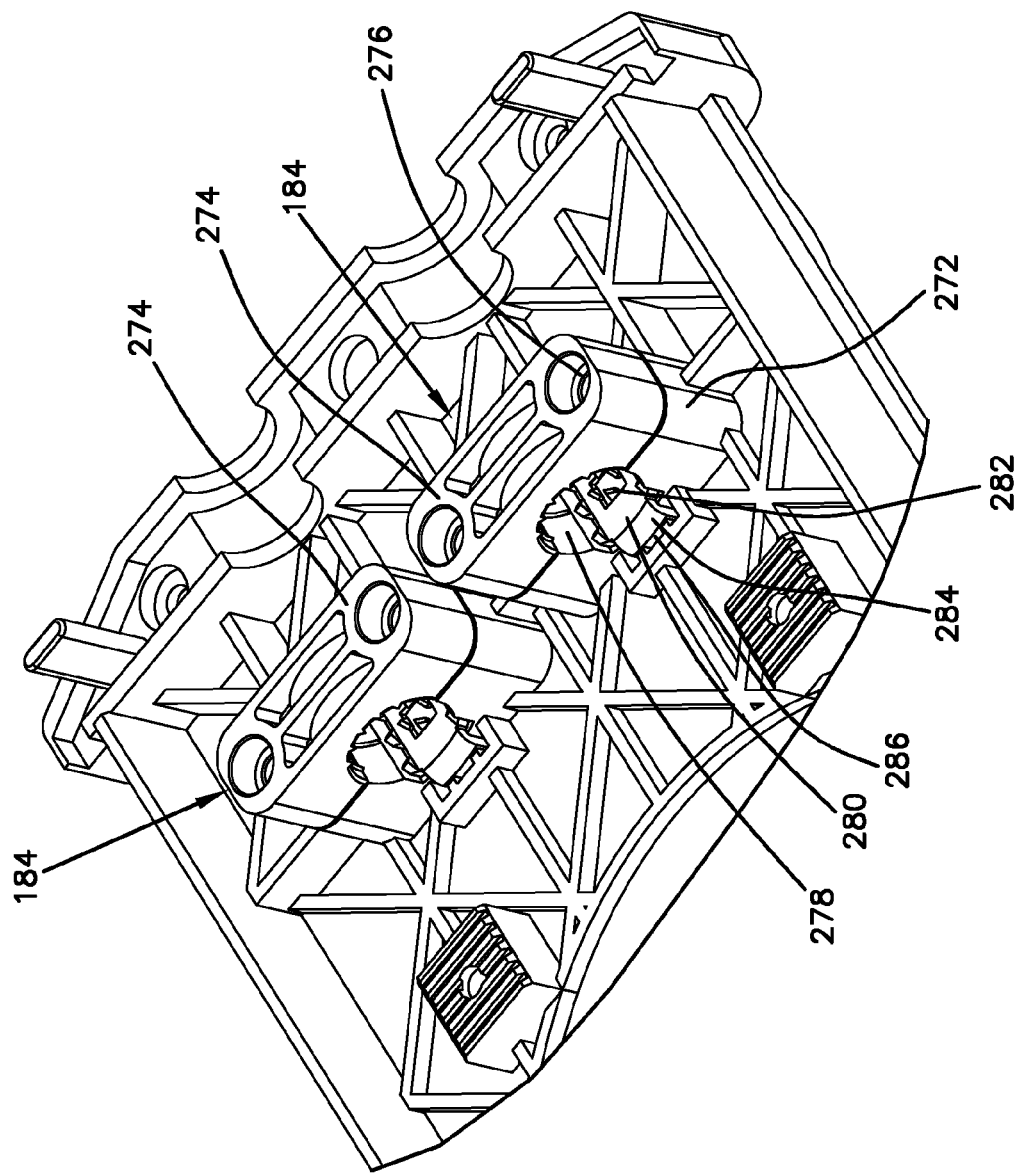
FIG. 16 is an enlarged view of the anchoring device of FIG. 15.
Figure 17:
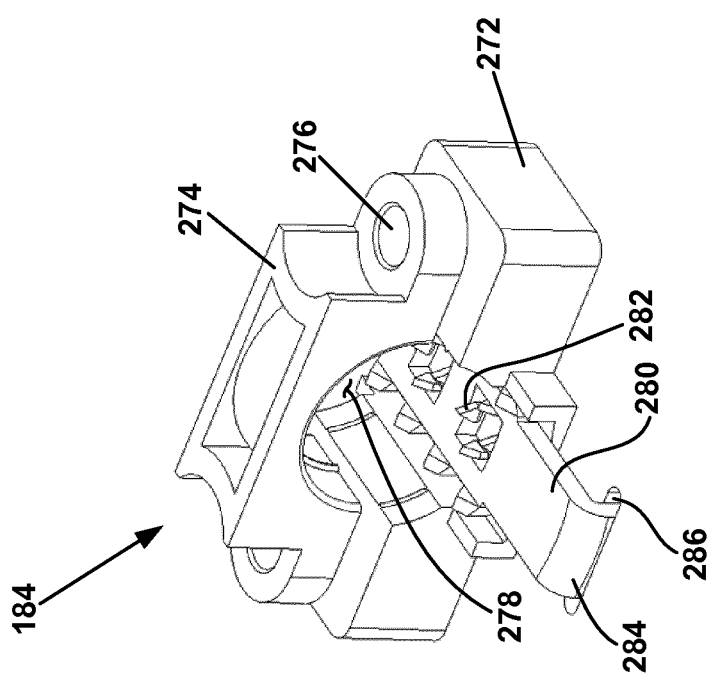
FIG. 17 is another exemplary anchoring device.

FIGS. 15-17 illustrate an anchoring device 184 according to one example of the present disclosure. In particular, FIG. 15 is an exemplary anchoring device 184 (e.g., a clamp) formed on the drawer 130. FIG. 16 is an enlarged view of the anchoring device 184 of FIG. 15. FIG. 17 is another exemplary anchoring device 184. As explained above, the anchoring device 184 operates to grip a portion of the main cable 90 and secure the main cable 90 onto the drawer 130. In some examples, the anchoring device 184 includes a fixing base 272 and a fixing cap 274. The fixing base 272 is formed on the bottom surface of the base plate 172 and the fixing cap 274 is configured to be coupled onto the fixing base 272 with fasteners 276, such as screws. The anchoring device 184 further includes a cable hole 278 defined by the fixing base 272 and the fixing cap 274. The cable hole 278 provides a passage through which the main cable 90 passes. The cable hole 278 also provides a grip for the main cable 90 to secure a portion of the main cable 90 in place. In some examples, the anchoring device 184 includes an elongate plate 280 exposed to the cable hole 278. The elongate plate 280 extends outside the cable hole 278 defined by the fixing base 272 and the fixing cap 274 so as to further support the main cable 90 and to prevent the cable 90 from twisting when the cable 90 is clamped at the anchoring device 184. The elongate plate 280 provides more gripping force to the main cable 90, thereby preventing torsion of the main cable 90.

In some examples, the anchoring device 184 further includes spikes 282 configured to be partially embedded in the jacket of the main cable 90, thereby prevent displacement or torsion of the main cable 90 within or around the anchoring device 184.

In some examples, the elongate plate 280 includes a turn-down flange 284 at a forward end of the elongate plate 280. The turn-down flange 284 is curved down toward the bottom surface of the base plate 172 and fixed to the base plate 172. In some examples, the turn-down flange 284 is inserted into a slot 286 formed on the base plate 172 to prevent the twisting of the cable supported by the elongate plate 280. For example, the turn-down flange 284 is engaged with the jacket of the main cable 90 and prevents the cable 90 from twisting when torsion is applied to the cable 90.

As shown in FIG. 17, the elongate plate 280 may further extend from the cable hole 278 to increase gripping force against the main cable 90 and further prevent torsion of the main cable 90. As other concepts and features are similar to the first example of anchoring device 184 shown in FIGS. 15 and 16, the further description for the anchoring device 184 shown in FIG. 17 is omitted for brevity purposes. Where like or similar features or elements are shown, the same reference numbers will be used where possible.

Figure 18:
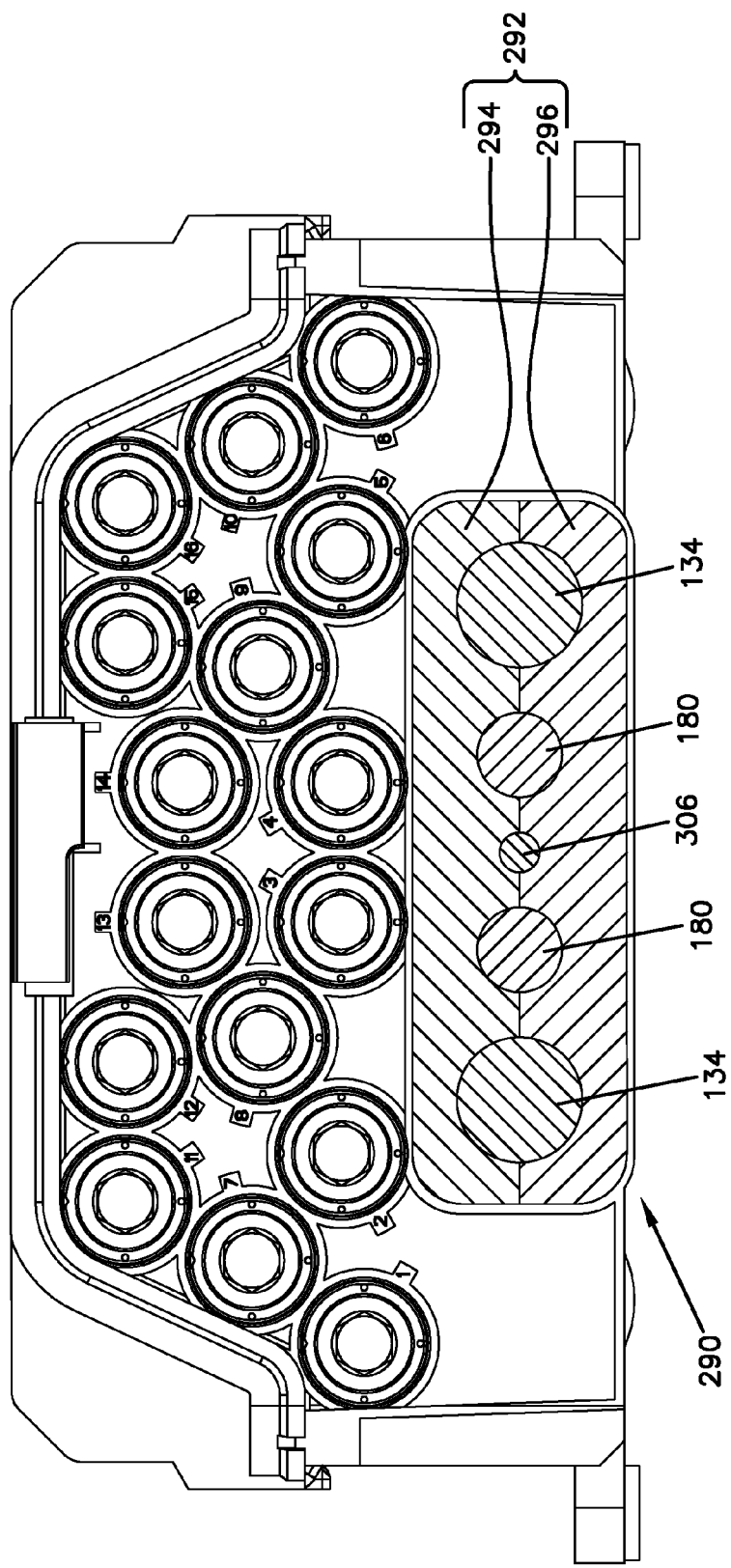
FIG. 18 is a cross-sectional view of an exemplary sealing unit.
Figure 19:
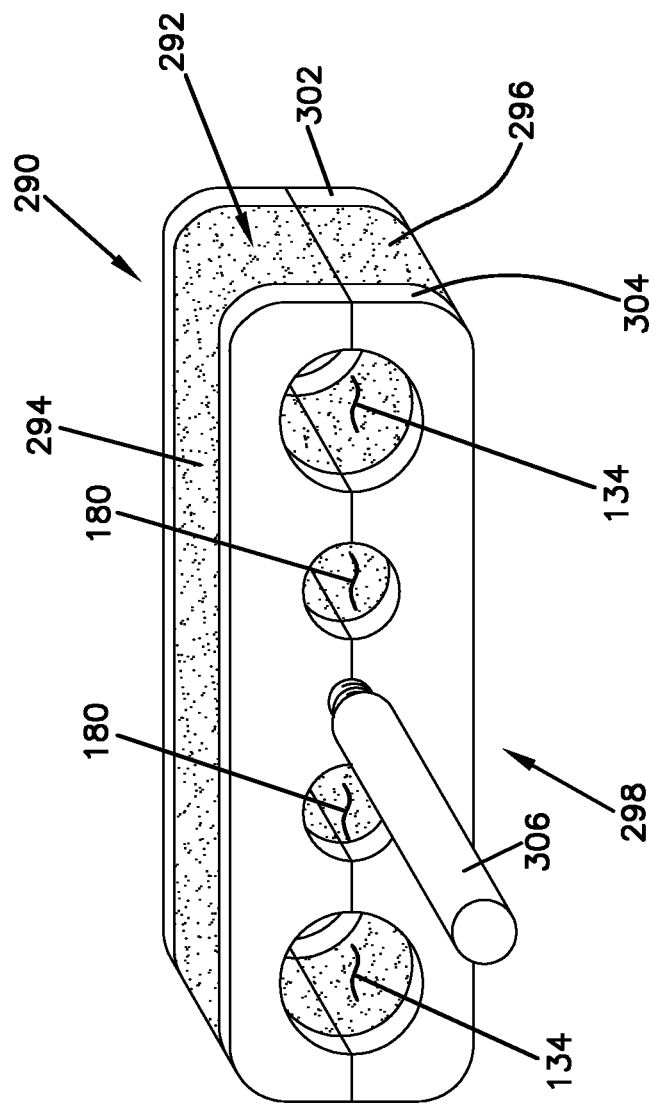
FIG. 19 is a schematic perspective view of the sealing unit of FIG. 18.

FIGS. 18 and 19 illustrate an exemplary sealing unit 290 for cable ports 134 and/or 180. In particular, FIG. 18 is a cross-sectional view of an exemplary sealing unit 290, and FIG. 19 is a schematic perspective view of the sealing unit 290 of FIG. 18. In some examples, the sealing unit 290 is configured in a wrap-around configuration. The sealing unit 290 includes a sealant ring 292 (e.g., gel, rubber, silicone rubber, or like materials) that defines the cable ports 180 and/or 134. The sealant ring 292 is formed by an upper sealing block 294 and a lower sealing block 296. The upper and lower sealing blocks 294 and 296 cooperate to define the cable ports 180 and/or 134 as well as the continuous sealant ring 292 against the enclosure 102.

The sealing unit 290 may include an actuation arrangement 298 for pressurizing the sealant ring 292, thereby causing the sealant ring 292 to form seals around cables routed through the cable ports 180 and/or 134. Further, the actuation arrangement 298 can also form seals around the sealing unit 290 relative to the enclosure 102 (e.g., the end plate 162). The actuation arrangement 298 includes inner and outer axial pressurization structures 302 and 304 between which the sealant ring 292 is positioned. The inner and outer axial pressurization structures 302 and 304 work together to pressurize the upper and lower sealing blocks 294 and 296 forming the sealing ring 292. Specifically, the upper and lower sealing blocks 294 and 296 are captured axially between positions of the inner and outer axial pressurization structures 302 and 304. Sealant pressurization force is transferred from the inner and outer axial pressurization structures 302 and 304 to the upper and lower sealing blocks 294 and 296 forming the sealing ring 292.

In some examples, the actuation arrangement 298 also includes an actuator 306 for forcing the inner and outer axial pressurization structures 302 and 304 together to pressurize the sealant ring 292. The pressurized sealant ring 292 forms seals at the cable ports 134 and 180 as well as seals between the sealing unit 290 and the enclosure 102 (e.g., the end plate 162).

In other examples, the sealant rings 292 are formed by a plurality of sealing blocks arranged either vertically or horizontally, or both. Such a plurality of sealing blocks may be engaged between the inner and outer axial pressurization structures 302 and 304 in a similar manner as described above. Examples of the wrap-around sealing configuration are described in U.S. Patent Application Ser. No. 61/766,523, titled CASE SEALING UNIT WITH MULTIPLE SEALING MODULES, and U.S. Patent Application Ser. No. 61/869,670, titled SEALING STRUCTURES FOR OPTICAL CABLE ENCLOSURE, filed on Aug. 24, 2013. The applications are hereby incorporated by reference in their entireties.

In other examples, the sealing unit 290 may be configured for the front plate 174 of the drawer 130.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

LIST OF REFERENCE NUMERALS AND CORRESPONDING FEATURES 90 optical fiber main cable
92 drop cable
94 splitter module
95 splitter
96 splitter input fiber
97 jacketed portion of the main cable
98 splitter output pigtails
99 unjacketed portion of the main cable
100 optical fiber splicing enclosure system
102 enclosure
104 base
106 cover
108 enclosure chamber
110 hinge
114 clamps
116 opposite lateral sides
120 toggle latch assembly
122 latch strike
124 lateral sides
126 lateral sides
130 drawer
132 fiber optic adaptor
134 cable port
136 splice tray
142 body
144 front end connector
146 back end connector
148 threaded portion
150 cap
152 O-ring
154 nut
162 end plate
164 insert hole
172 base plate
174 face plate
176 loop guide
175 lower plate part
177 fiber management loop
178 guide tabs
179 upper plate part
180 main cable ports
182 drawer latch assembly
184 cable anchoring device
186 drawer latch tab
188 fastening device
190 sliding lock
192 sliding bar 194 locking tab
196 position indicator
202 bottom edge
204 bottom edge
210 sealing mechanism
212 labyrinth seal
214 gasket seal
216 projections
218 projections
220 splice tray tower
222 tray plate
224 curved base
226 tower ladder
228 routing guide
240 splitter engaging area
242 grooves
250 cable stop
252 stop base
254 clamping cover
256 stop wall
258 fasteners
272 fixing base
274 fixing cap
276 fasteners
278 cable hole
280 elongate plate
282 spikes
284 turn-down flange
286 slot
290 sealing unit
292 sealant ring
294 upper sealing block
296 lower sealing block
298 actuation arrangement
302 inner axial pressurization structures
304 outer axial pressurization structures
306 actuator

What is claimed is:

1. A fiber optic enclosure system comprising:
an enclosure defining an enclosure chamber, wherein the enclosure includes an end plate having an insert hole and wherein the enclosure chamber includes a drawer latch tab;
a plurality of fiber optic adaptors arranged in the enclosure, each fiber optic adaptor including a first port and a second port that are configured to receive fiber optic connectors, the first port accessible from an outer side of the enclosure and the second port accessible from an inner side of the enclosure; and
a drawer for anchoring and managing a pass-through cable configured to pass through the enclosure, the drawer configured to be removably inserted through the insert hole of the end plate to be received within the enclosure chamber, the drawer including:
 a face plate that interfaces with the end plate of the enclosure when the drawer is fully inserted through the insert hole of the end plate
 an anchoring device for anchoring jacketed portions of the pass-through cable;
 a fiber loop guide defining a fiber management loop at which an unjacketed portion of the pass-through cable is stored in a looped configuration; and
 a drawer latch assembly that interfaces with the drawer latch tab of the enclosure chamber when the drawer is fully inserted through the insert hole of the end plate of the enclosure, the interfacing of the drawer latch assembly and the drawer latch tab causing the face plate of the drawer to at least partially sealingly engage with the end plate of the enclosure,
wherein the pass-through cable can be anchored to the drawer and the unjacketed portion of the pass-through cable can be stored in the looped configuration at the fiber management loop before the drawer is inserted into the enclosure chamber.

2. The system according to claim 1, wherein the enclosure includes an insert hole configured to receive the drawer therethrough, and
wherein the drawer comprises:
 a base plate including a loop guide configured to route the pass-through cable therealong and a guide tab configured to contain the pass-through cable therebehind; and
 a face plate including a plurality of pass-through cable ports through which the pass-through cable is received onto the base plate, the face plate configured to engage the insert hole of the enclosure when the drawer is inserted to the enclosure chamber.

3. The system according to claim 1, wherein the enclosure having a cover and a base, the cover movable relative to the base between an open position and a closed position, and the base including a endplate, wherein the enclosure defines the enclosure chamber when the cover is in the closed position,
wherein the plurality of fiber optic adaptors are arranged on the endplate of the base, and
wherein the cover does not include fiber optic adaptors.

4. The system according to claim 3, wherein the insert hole is arranged on the endplate of the base.

5. The system according to claim 3, wherein the enclosure includes a latch assembly and a latch tab, the latch tab arranged on lateral sides of the body, and the latch assembly arranged on lateral sides of the cover and configured to engage the latch tab to secure the cover to the body in the closed position.

6. The system according to claim 3, wherein the enclosure includes a tool-less sliding lock configured to secure the cover to the base.

7. The system according to claim 6, wherein the sliding lock includes a sliding bar slideably arranged on the cover and a locking tab formed on the base, the sliding bar configured to engage the locking tab when the cover and the base are in the closed position relative to each other.

8. The system according to claim 3, wherein the enclosure includes a labyrinth seal formed by a first peripheral edge of the cover and a second peripheral edge of the base, the first peripheral edge of the cover configured to engage the second peripheral edge of the base.

9. The system according to claim 8, wherein the enclosure includes a gasket seal engaged between the first and second peripheral edges.

10. The system according to claim 1, further comprising:
one or more splice trays on which optical fibers are spliced; and
a splice tray tower configured to receive a portion of the drawer and pivotally mount the splice trays in a raised position.

11. The system according to claim 10, wherein the splice tray tower includes a routing guide having a curved surface configured to route cables therealong at a radius not less than a minimum bend radius of the cables.

12. The system according to claim 10, wherein at least part of the splice trays include a splitter engaging area configured to engage a splitter.

13. The system according to claim 1, further comprising a cable stop configured to limit an extension of a strength member out of a cable.

14. The system according to claim 1, wherein the drawer includes an anchoring device, the anchoring device comprising:
    a fixing base formed on the drawer;
    a fixing cap configured to be fastened to the fixing base to define a cable hole through which the pass-through cable passes; and
    an elongate plate extending outside the cable hole and configured to support the pass-through cable to prevent torsion of the pass-through cable.

15. The system according to claim 1, wherein the drawer latch assembly is configured to pressurize the drawer onto the enclosure such that a sealing member engaged between the drawer and the enclosure remains compressed therebetween.

16. The system according to claim 1, further comprising:
    a sealing unit configured in a wrap-around configuration, defining cable ports for a cable.

17. The system according to claim 16, wherein the sealing unit comprises:
    a sealant ring having a plurality of sealing blocks, the sealing blocks defining the cable ports when coupled; and
    an actuation arrangement configured to pressurize the sealant ring to cause the sealant ring to form seals around the cable routed through the cable ports and seals around the sealing unit relative to the enclosure.

18. The system according to claim 17, wherein the actuation arrangement comprises:
    first and second pressurization structures between which the sealant ring is positioned; and
    an actuator configured to force the first and second pressurization structures together to pressurize the sealant ring.

19. A fiber optic enclosure system comprising:
    an enclosure defining an enclosure chamber and having an end plate, the enclosure having an elongate axis, the end plate having an insert hole that provides access to the enclosure chamber;
    a plurality of fiber optic adaptors arranged in the end plate of the enclosure, each fiber optic adaptor including a first port and a second port that are configured to receive fiber optic connectors, the first port accessible from an outer side of the enclosure and the second port accessible from an inner side of the enclosure; and
    a drawer for anchoring and managing a pass-through cable configured to pass through the enclosure, the drawer configured to be slidably inserted, in a direction of the elongate of the axis of the enclosure, through the insert hole of the end plate and into the enclosure chamber to present a base plate of the drawer in an orientation substantially parallel to a lower face of the enclosure, the drawer comprising:
        the base plate having a width enabling it to be received within the insert hole of the end plate;
        a face plate at a first end of the base plate, wherein the face plate has a width greater than the width of the base plate and greater than a width of the insert hole, and wherein a portion of the face plate that extends beyond the width of the insert hole interfaces with the endplate of the enclosure when the drawer is fully inserted through the insert hole of the end plate;
        an anchoring device for anchoring jacketed portions of the pass-through cable; and
        a fiber loop guide defining a fiber management loop at which an unjacketed portion of the pass-through cable is stored in a looped configuration,
    wherein the pass-through cable can be anchored to the drawer and the unjacketed portion of the pass-through cable can be stored in the looped configuration at the fiber management loop before the drawer is inserted into the enclosure chamber.

20. A fiber optic enclosure system comprising:
    an enclosure defining an enclosure chamber;
    a plurality of fiber optic adaptors arranged in the enclosure, each fiber optic adaptor including a first port and a second port that are configured to receive fiber optic connectors, the first port accessible from an outer side of the enclosure and the second port accessible from an inner side of the enclosure; and
    a drawer for anchoring and managing a pass-through cable configured to pass through the enclosure, the drawer configured to be removably inserted into the enclosure chamber and comprising:
        an anchoring device for anchoring jacketed portions of the pass-through cable; and
        a fiber loop guide defining a fiber management loop at which an unjacketed portion of the pass-through cable is stored in a looped configuration,
    wherein the pass-through cable can be anchored to the drawer and the unjacketed portion of the pass-through cable can be stored in the looped configuration at the fiber management loop before the drawer is inserted into the enclosure chamber,
    wherein the enclosure having a cover and a base, the cover movable relative to the base between an open position and a closed position, and the base including a endplate, wherein the enclosure defines the enclosure chamber when the cover is in the closed position,
    wherein the plurality of fiber optic adaptors are arranged on the endplate of the base,
    wherein the cover does not include fiber optic adaptors,
    wherein the enclosure includes a labyrinth seal formed by a first peripheral edge of the cover and a second peripheral edge of the base, the first peripheral edge of the cover configured to engage the second peripheral edge of the base, and
    wherein the enclosure includes a gasket seal engaged between the first and second peripheral edges.

21. A fiber optic enclosure system comprising:
    an enclosure defining an enclosure chamber;
    a plurality of fiber optic adaptors arranged in the enclosure, each fiber optic adaptor including a first port and a second port that are configured to receive fiber optic connectors, the first port accessible from an outer side of the enclosure and the second port accessible from an inner side of the enclosure; and
    a drawer for anchoring and managing a pass-through cable configured to pass through the enclosure, the drawer configured to be removably inserted into the enclosure chamber and comprising:
        an anchoring device for anchoring jacketed portions of the pass-through cable; and
        a fiber loop guide defining a fiber management loop at which an unjacketed portion of the pass-through cable is stored in a looped configuration,
    wherein the pass-through cable can be anchored to the drawer and the unjacketed portion of the pass-through cable can be stored in the looped configuration at the fiber management loop before the drawer is inserted into the enclosure chamber, wherein the drawer includes a drawer latch assembly configured to secure the drawer to the enclosure when the drawer is inserted into the enclosure, and wherein the drawer latch assembly is configured to pressurize the drawer onto the enclosure such that a sealing member engaged between the drawer and the enclosure remains compressed therebetween.

22. A fiber optic enclosure system comprising:

an enclosure defining an enclosure chamber;

a plurality of fiber optic adaptors arranged in the enclosure, each fiber optic adaptor including a first port and a second port that are configured to receive fiber optic connectors, the first port accessible from an outer side of the enclosure and the second port accessible from an inner side of the enclosure;

a drawer for anchoring and managing a pass-through cable configured to pass through the enclosure, the drawer configured to be removably inserted into the enclosure chamber and comprising:

an anchoring device for anchoring jacketed portions of the pass-through cable; and a fiber loop guide defining a fiber management loop at which an unjacketed portion of the pass-through cable is stored in a looped configuration; and a sealing unit configured in a wrap-around configuration, defining cable ports for a cable, the sealing unit including:

a sealant ring having a plurality of sealing blocks, the sealing blocks defining the cable ports when coupled; and an actuation arrangement configured to pressurize the sealant ring to cause the sealant ring to form seals around the cable routed through the cable ports and seals around the sealing unit relative to the enclosure, wherein the pass-through cable can be anchored to the drawer and the unjacketed portion of the pass-through cable can be stored in the looped configuration at the fiber management loop before the drawer is inserted into the enclosure chamber.

23. The system according to claim 22, wherein the actuation arrangement comprises:

first and second pressurization structures between which the sealant ring is positioned; and an actuator configured to force the first and second pressurization structures together to pressurize the sealant ring.

* * * * *